United States Patent [19]
Taylor

[11] Patent Number: 6,154,553
[45] Date of Patent: *Nov. 28, 2000

[54] SOUND BUBBLE STRUCTURES FOR SOUND REPRODUCING ARRAYS

[75] Inventor: Stephen Francis Taylor, Pacific Palisades, Calif.

[73] Assignee: Taylor Group of Companies, Inc., Santa Monica, Calif.

[*] Notice: This patent is subject to a terminal disclaimer.

[21] Appl. No.: 08/977,729

[22] Filed: Nov. 25, 1997

Related U.S. Application Data

[63] Continuation of application No. 08/631,705, Apr. 4, 1996, Pat. No. 5,745,584, which is a continuation-in-part of application No. 08/245,160, May 17, 1994, Pat. No. 5,590,207, which is a continuation-in-part of application No. 08/166,463, Dec. 14, 1993, Pat. No. 5,517,570.

[51] Int. Cl.⁷ ..................................................... H04R 1/02
[52] U.S. Cl. .............................................................. 381/332
[58] Field of Search ..................... 381/332, 182, 381/385, 376, 374, 381, 334, 336, 333, 335, 74, 18, 23, 17; 244/1 N

[56] References Cited

U.S. PATENT DOCUMENTS

| | | |
|---|---|---|
| 4,236,039 | 11/1980 | Cooper . |
| 4,497,023 | 1/1985 | Moorer . |
| 4,685,134 | 8/1987 | Wine . |
| 4,736,333 | 4/1988 | Mead et al. . |
| 4,818,938 | 4/1989 | Sattin et al. . |
| 4,893,256 | 1/1990 | Rutherfoord et al. . |
| 4,905,094 | 2/1990 | Pocock et al. . |
| 4,933,768 | 6/1990 | Ishikawa et al. . |
| 5,052,685 | 10/1991 | Okada et al. . |
| 5,065,345 | 11/1991 | Knowles et al. . |
| 5,095,798 | 3/1992 | Okada et al. . |
| 5,109,482 | 4/1992 | Bohrman . |
| 5,111,409 | 5/1992 | Gasper et al. . |
| 5,119,474 | 6/1992 | Beitel et al. . |
| 5,119,479 | 6/1992 | Beitel et al. . |
| 5,233,664 | 8/1993 | Yanagawa et al. . |
| 5,265,165 | 11/1993 | Rauch . |
| 5,386,082 | 1/1995 | Stevenson et al. . |
| 5,440,638 | 8/1995 | Lowe et al. . |
| 5,467,401 | 11/1995 | Nagamitsu et al. . |
| 5,500,900 | 3/1996 | Chen et al. . |

*Primary Examiner*—Vivian Chang
*Attorney, Agent, or Firm*—Gates & Cooper

[57] ABSTRACT

A sound bubble for generating three-dimensional aural phenomenon from a two-dimensional sound reproducing surface. The surface is comprised of sound pixels that are discrete, addressable output locations for audio data streams.

5 Claims, 32 Drawing Sheets

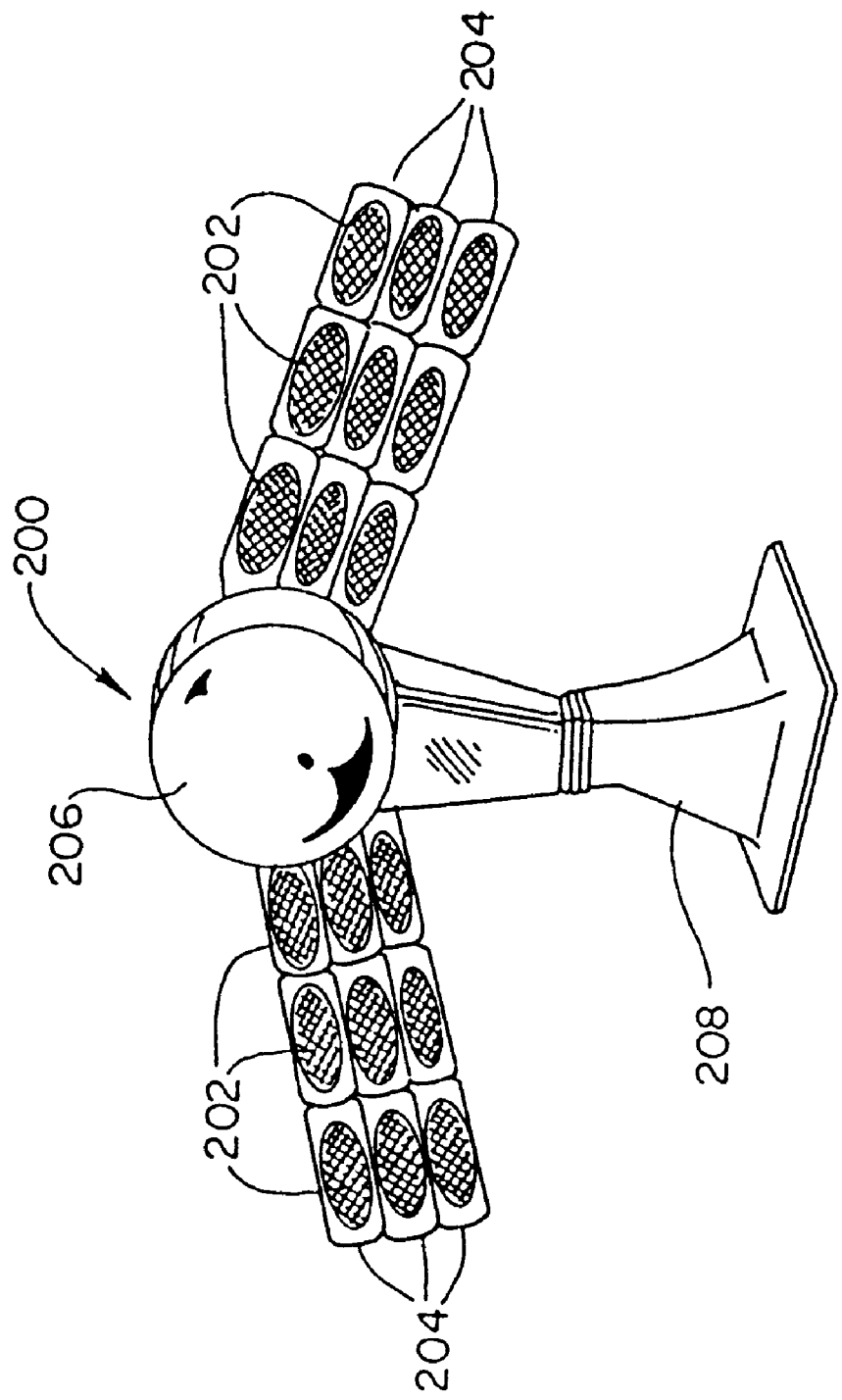

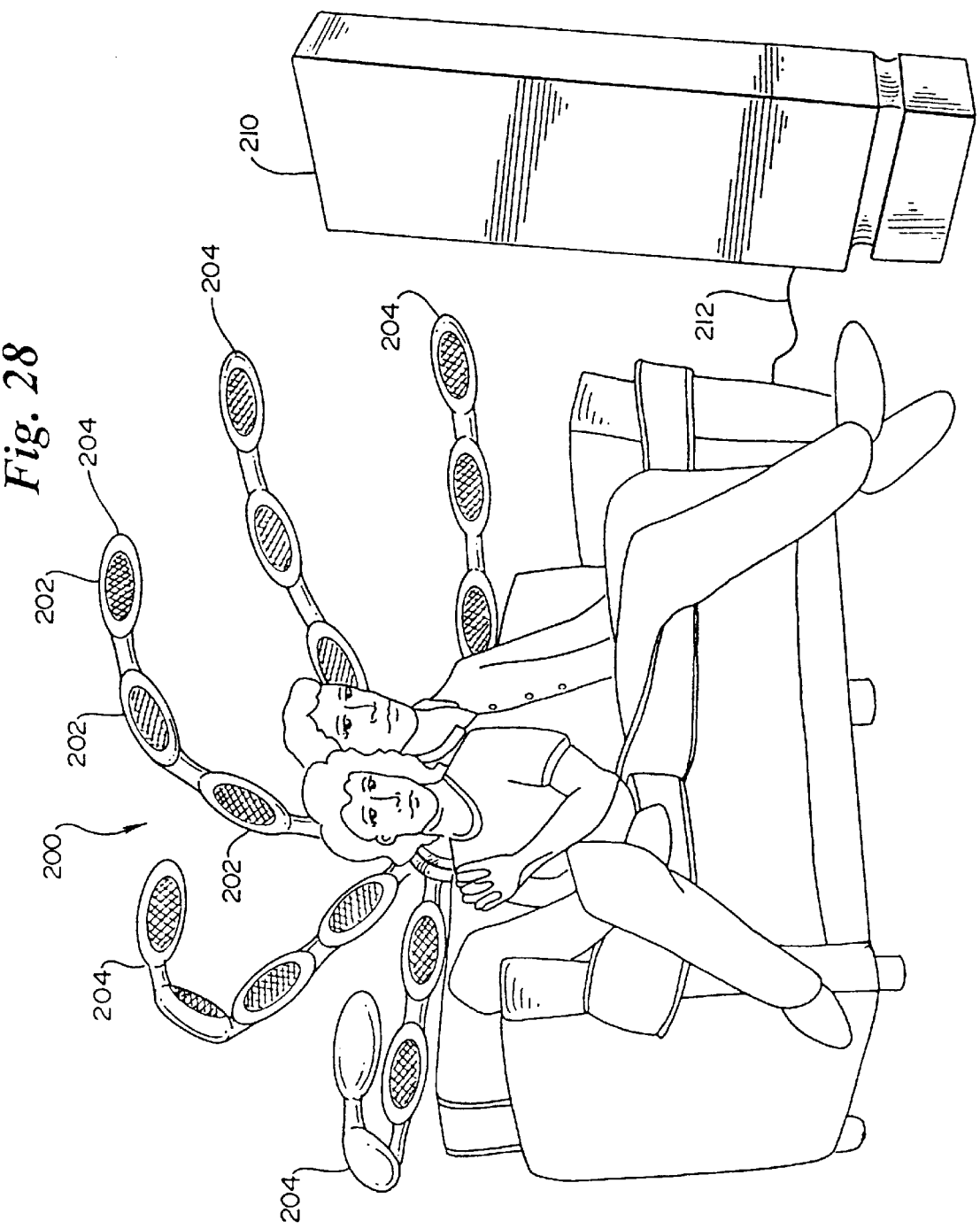

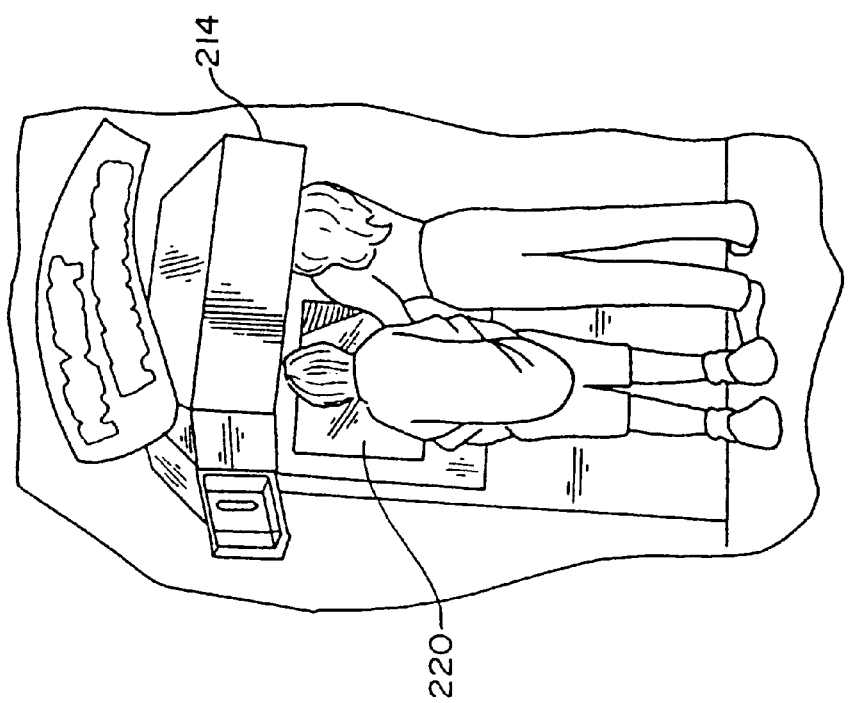
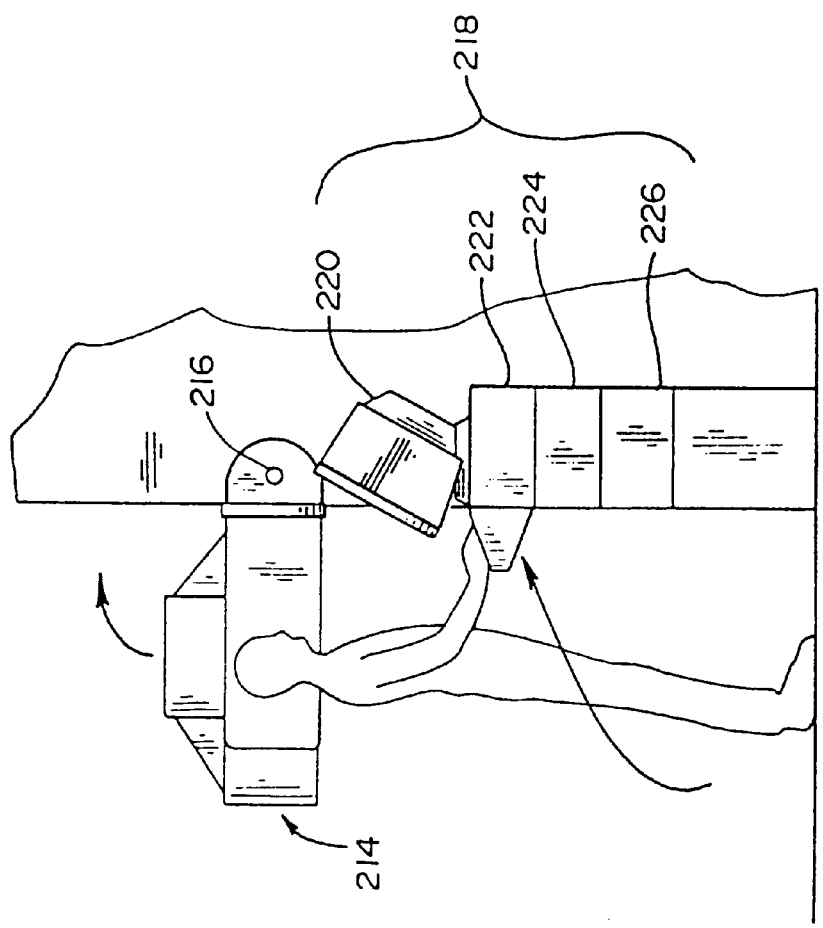

SOUND BUBBLE STRUCTURES FOR SOUND
REPRODUCING ARRAYS

CROSS-REFERENCE TO RELATED APPLICATIONS

This application is a continuation of application Ser. No. 08/631,705, filed Apr. 4, 1996, by Stephen F. Taylor, entitled "SOUND BUBBLE STRUCTURE FOR SOUND REPRODUCING ARRAYS", which application now U.S. Pat. No. 5,745,584, is a continuation-in-part of application Ser. No. 08/245,160, entitled "SOUND REPRODUCING ARRAY PROCESSOR SYSTEM," filed on May 17, 1994, now U.S. Pat. No. 5,590,207 by Stephen F. Taylor, which application is a continuation-in-part of application Ser. No. 08/166,463, entitled "SOUND REPRODUCING ARRAY PROCESSOR SYSTEM," filed on Dec. 14, 1993, now U.S. Pat. No. 5,517,570 by Stephen F. Taylor, all of which applications are incorporated herein by reference.

BACKGROUND OF THE INVENTION

1. Field of the Invention

This invention relates in general to multi-channel audio production, editing and playback systems, and in particular to sound bubble structures for sound reproducing arrays.

2. Description of Related Art

As with light sources, sound sources possess a spectral signature. Recent research has revealed the non-periodic nature of many acoustical waveforms, despite the preponderance of observable fundamentals and harmonics. The spectral signatures of real-world sound sources have been shown to change over time, particularly when it is viewed in terms of decay and reflection through boundaries. However, current sound reproduction systems have proved inadequate in the characterization of sound sources which are, by nature, dynamic entities.

With the continuing evolution of digital audio technology, breakthroughs seem to be commonplace in sound reproduction methods. In truth, however, it is not really possible to introduce real innovation into audio entertainment without controlling the recording/playback chain. This is quite significant since it is well known in high-end consumer audio circles that the truly difficult task in the design of audio equipment is not the creation of sound stage depth, but rather, the realistic and accurate preservation of horizontal and vertical location of objects and events.

Careful attention to the phase response of the reproduction chain can do much to resolve the perceived depth of a recording. The "distance back" aspect of reproduction requires the preservation of very subtle timing relationships within the recorded material, often as small as microseconds. As a design task, this is less difficult to execute than to project the more complex and subtle cues that convey XY plane location and "vaulting" ambience. The accurate re-creation of the true ambient "feel" of a real-world sonic event requires the neutral transfer of a great amount of information, i.e., electronically encoded cues that, when replayed, provide the illusion of "liveness".

The preservation of the subtle minutiae that convey accurate spacing and size of the recorded events is also important. In a channel reproduction system, this is exceedingly difficult to do. On the production side, the illusions of XY plane location, and even size and space, are projected by means of ingenious but often tortuous production techniques. For example, the continued development of surround sound technology extends and enhances these methods.

Still, these techniques are attempts to ameliorate problems inherited from earlier, more primitive technology. In any case, the efforts are largely wasted in that the vast majority of venue playback systems lack even rudimentary elements of good sonic designs.

SUMMARY OF THE INVENTION

To overcome the limitations in the references described above, and to overcome other limitations that will become apparent upon reading and understanding the present specification, the present invention discloses a sound bubble structure comprising an integrally connected sound reproducing surface comprised of sound pixels that are discrete, addressable output locations. In the present invention, actual or synthetic recorded audio material is decomposed into discrete sound sources which are then mapped to the sound pixels.

BRIEF DESCRIPTION OF THE DRAWINGS

Referring now to the drawings in which like reference numbers represent corresponding parts throughout:

FIG. 27 is a perspective view of an alternative embodiment of the present invention according to the present invention;

FIG. 28 is another view of the structure of FIG. 27;

FIG. 29 is a perspective view of an alternative embodiment of the present invention according to the present invention;

FIG. 30 is another view of the structure of FIG. 29;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 1:
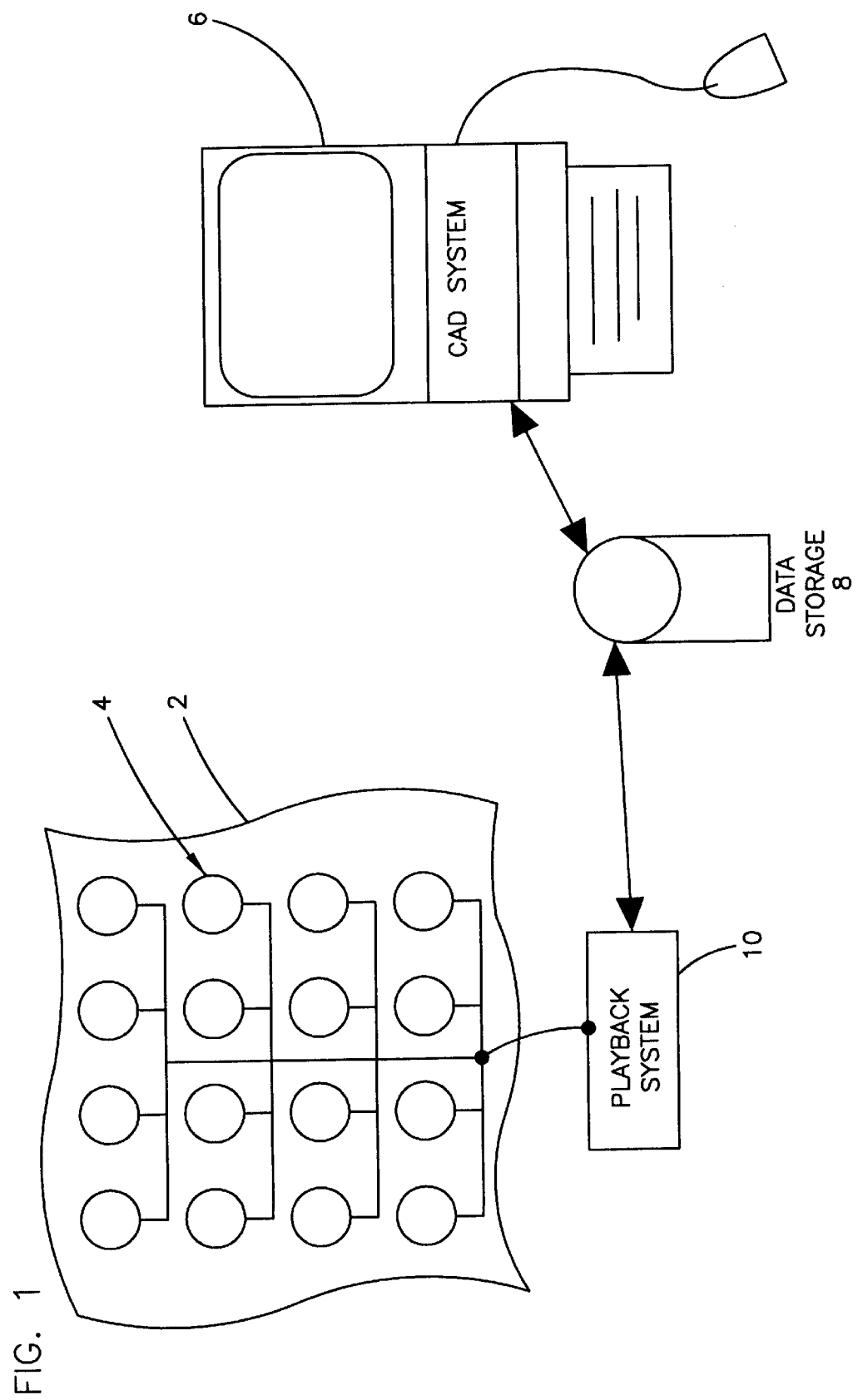
FIG. 1 is a block diagram illustrating the basic components of the present invention.

FIG. 1 is a block diagram illustrating the basic components of the present invention, including a sound reproducing surface 2 comprised of a plurality of transducers or sound pixels 4, a computer-aided design (CAD) system 6 for creating data streams to control the sound pixels 4, a data storage device 8 for storing the data streams, and a playback system 10 for retrieving the data streams from the data storage device 8 and operating the sound pixels 4 in response thereto. The present invention is intended to have applications in several markets, ranging from special venue entertainment markets such as video arenas and theme parks, to more commonplace markets such as concert halls, theaters and video games.

In the present invention, a deformable two-dimensional sound reproducing surface 2 is defined by the outer edges of a plurality of transducers called sound pixels 4. The sound pixels 4 are typically arranged within the surface 2 as a two-dimensional matrix so as to support the propagation and movement of the acoustical energy along the axes of the matrix. However, the surface 2 and the sound pixels 4 can be deformed into three dimensional shapes such as spheres, ellipses, or cubes. When deformed into such three dimensional shapes, the surface 2 supports the propagation and movement of the acoustical energy in three dimensions.

Figure 2:
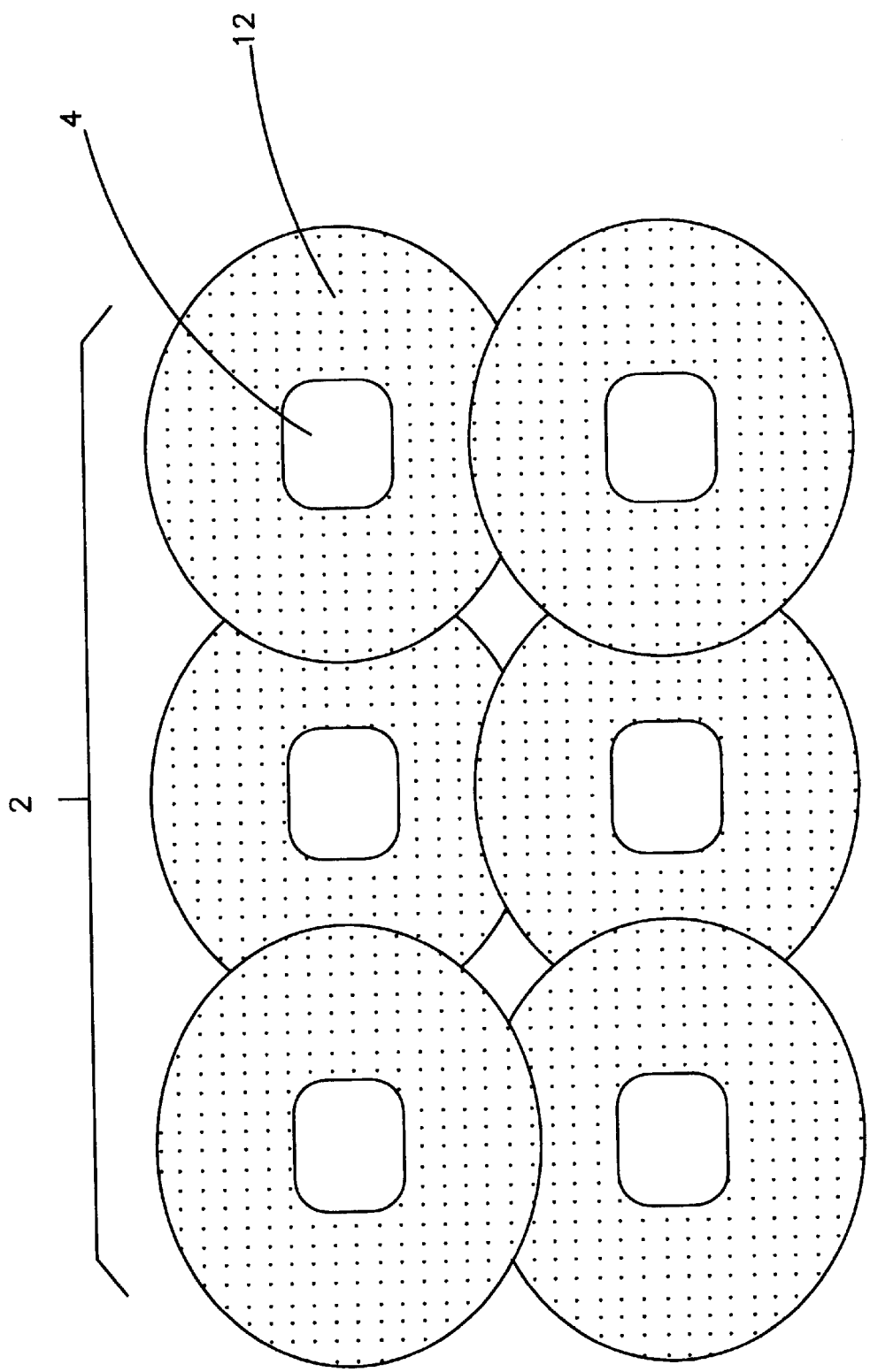
FIG. 2 is a block diagram illustrating the effects of the combined operation of the sound pixels according to the present invention.

FIG. 2 is a block diagram illustrating the effects of the combined operation of the sound pixels 4 according to the present invention. The surface 2 may be discontinuous in that the outer edges of the sound pixels 4 need not be physically connected. More specifically, the surface 2 is defined by the overlapping acoustical energy 12 generated individually by each sound pixel 4. The sound pixels 4 each comprise a discrete, addressable output location, wherein audio material is decomposed into a plurality of discrete data streams that are mapped to the sound pixels 4. The data streams each comprise a spatial portion of an overall acoustical ambiance being reproduced by the system. To accomplish this effect, the data streams synchronize and interlink the sound pixels 4 to reproduce a time line of an acoustical energy source radiating and moving through space. Thus, although the sound pixels 4 are individual point sources of acoustical energy 12, the present invention binds the sound pixels 4 together into a single, unified, "active" surface 2. This creates a "meta-speaker" defined by the summed energy of the sound pixels 4. One advantage of this approach is that sound sources can be located very precisely within the surface and can be moved in three dimensions (left to right, up and down, and back and front).

Figure 3A:
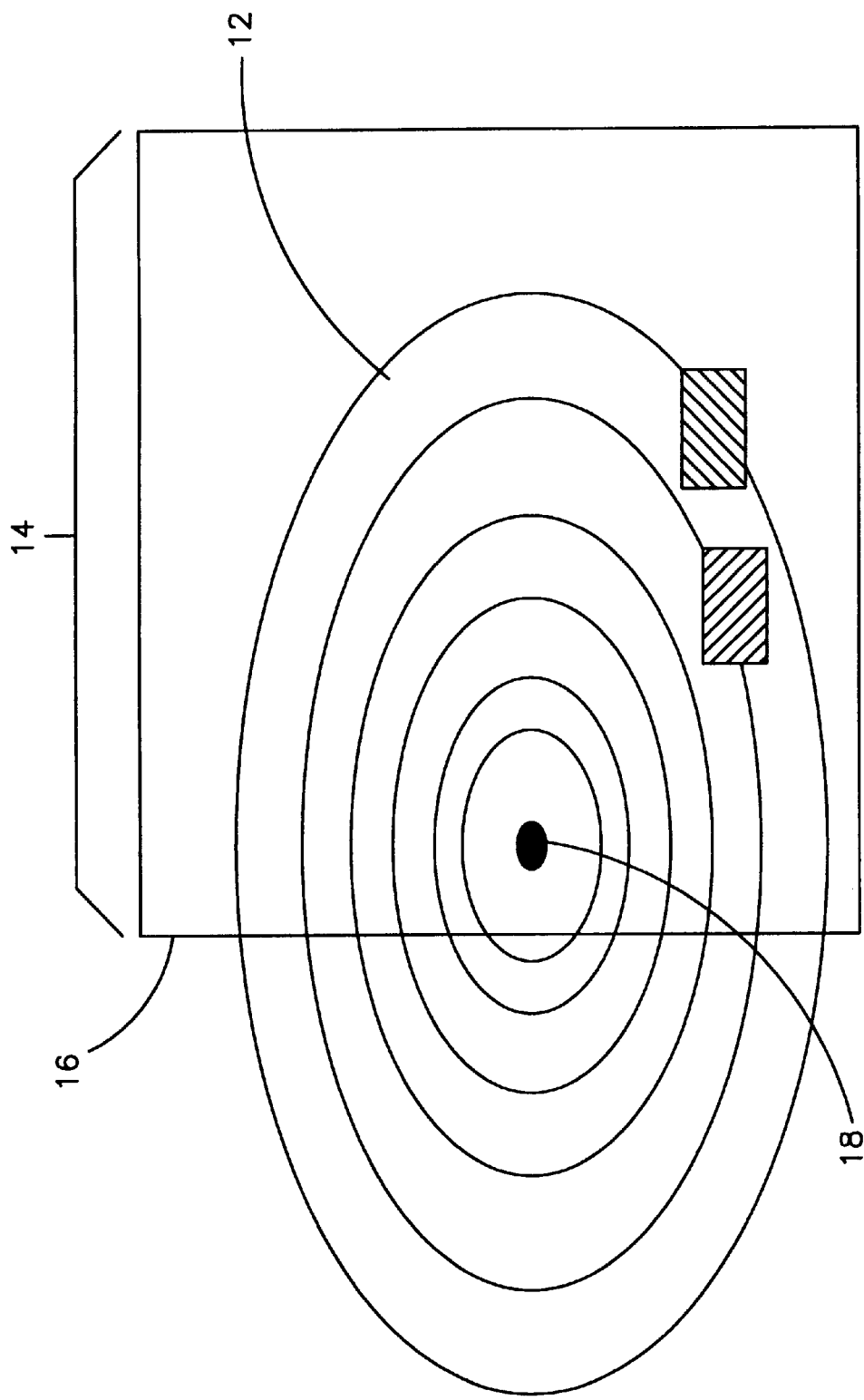
FIG. 3A is a block diagram illustrating the conceptual aspects of the computer-aided design (CAD) system according to the present invention.

FIG. 3A is a block diagram illustrating the conceptual aspects of the CAD system 6 according to the present invention. The CAD system 6 guides a sound designer through the modeling of the acoustical playback environment to create the data streams for playback through the sound pixels 4, although manual methods of constructing the data streams may be also used. The CAD system 6 is used by the sound designer to create a virtual acoustical environment (VAE) 14, modeled on an actual acoustical environment, to automate the capture or creation of propagating acoustical energy 12 within the modeled environment and to transform this captured acoustical energy 12 into the data streams for playback purposes.

The CAD system 6 allows the sound designer to assign real world acoustical properties and dimensions to the VAE 14. The properties and dimensions of the VAE 14 affect the amplitude, spectral and phase characteristics of sound sources within the VAE 14. The CAD system 6 also allows a sound designer to place sound sources in X, Y, and Z axes in the VAE 14 and to move them through space over time. The placement and movement of other objects in the VAE 14 may also affect the amplitude, spectral and phase characteristics of the sound sources.

The CAD system 6 characterizes how acoustical energy 12 would propagate through the VAE 14 over time and how that acoustical energy 12 would strike a "virtual surface" 16 within the VAE 14. The virtual surface 16 is interposed between sound sources 18 within the VAE 14 and where the audience would reside during playback, e.g., on the left side of the virtual surface 16 in FIG. 3A. The actual sound reproducing surface 2, defined as the summation of the overlapping acoustical energy of the sound pixels 4, is substituted for the virtual surface 16 during playback. Both the sound reproducing surface 2 and the virtual surface 16 can be modeled to comprise any number of sound pixels 4, which in turn defines their resolution. Typically, each playback venue would be represented by a different virtual surface 16 having a particular dimensional aspect and sound pixel 4 configuration reflecting the actual sound reproducing surface 2. Although the virtual surface 16, the sound reproducing surface 2, and the corresponding sound pixels 4 are defined in two dimensions, they are deformable into three dimensional shapes within the CAD system 6 and during playback.

The CAD system 6 uses digital filters to allow the sound designer to simulate real-world ambience and re-create the tangible events that form the basis for spatial perception of sound. Physical conditions associated with the VAE 14, including temporal and spectral characteristics, provide the parameters for the filters. Although the virtual surface 16 is within the VAE 14, it does not affect the acoustic response of the VAE 14, because it is treated as an interception plane. However, the virtual surface 16 captures the acoustical energy 12 pattern as a replication of the absorptive and reflective characteristics of the VAE 14.

Audio material is "painted" onto the VAE 14 and virtual surface 16 in a manner similar to an artist laying brush strokes on a canvas. Another way to look at the present invention is as a discrete-time digital sound stage, wherein the sound designer assumes the role of stage director, placing objects in areas on a stage, and orchestrating their interaction. Moreover, the sound designer can re-create the interaction of multiple sound objects with one another within the VAE 14, so that the additive nature of real-world sonic waveform interaction can be reproduced. In addition, the sound objects can be propagated through space to represent changes in their location within the VAE 14.

During compilation, the sound objects are retrieved from the storage device 8 and the acoustical energy 12 resulting therefrom is processed through one or more digital filters reflecting the characteristics of the VAE 14. The VAE 14 is treated as a distributive digital filter comprised of all the reflective and absorptive surfaces, materials and objects modeled therein. In addition, venue anomalies would be accounted for in the digital filters used to create the data streams. The compilation also takes into account the geometry and dimensions of the virtual surface 16 and sound reproducing surface 2, including the number of sound pixels 4 therein.

The CAD system 6 models the instantaneous state of the acoustical energy 12 propagating through the VAE 14, both in magnitude and frequency, on a time increment basis (e.g., millisecond by millisecond). The CAD system 6 then calculates the intersection of the modeled acoustical energy 12 with the theoretical plane represented by the virtual surface 16. Finally, the CAD system 6 reduces these calculation data streams and stores them for later playback. The data streams represent the characteristics of the acoustical energy 12 striking the virtual surface 16 at discrete points, wherein the discrete points represent a location of a sound pixel 4 on the sound reproducing surface 2.

Figure 3B:
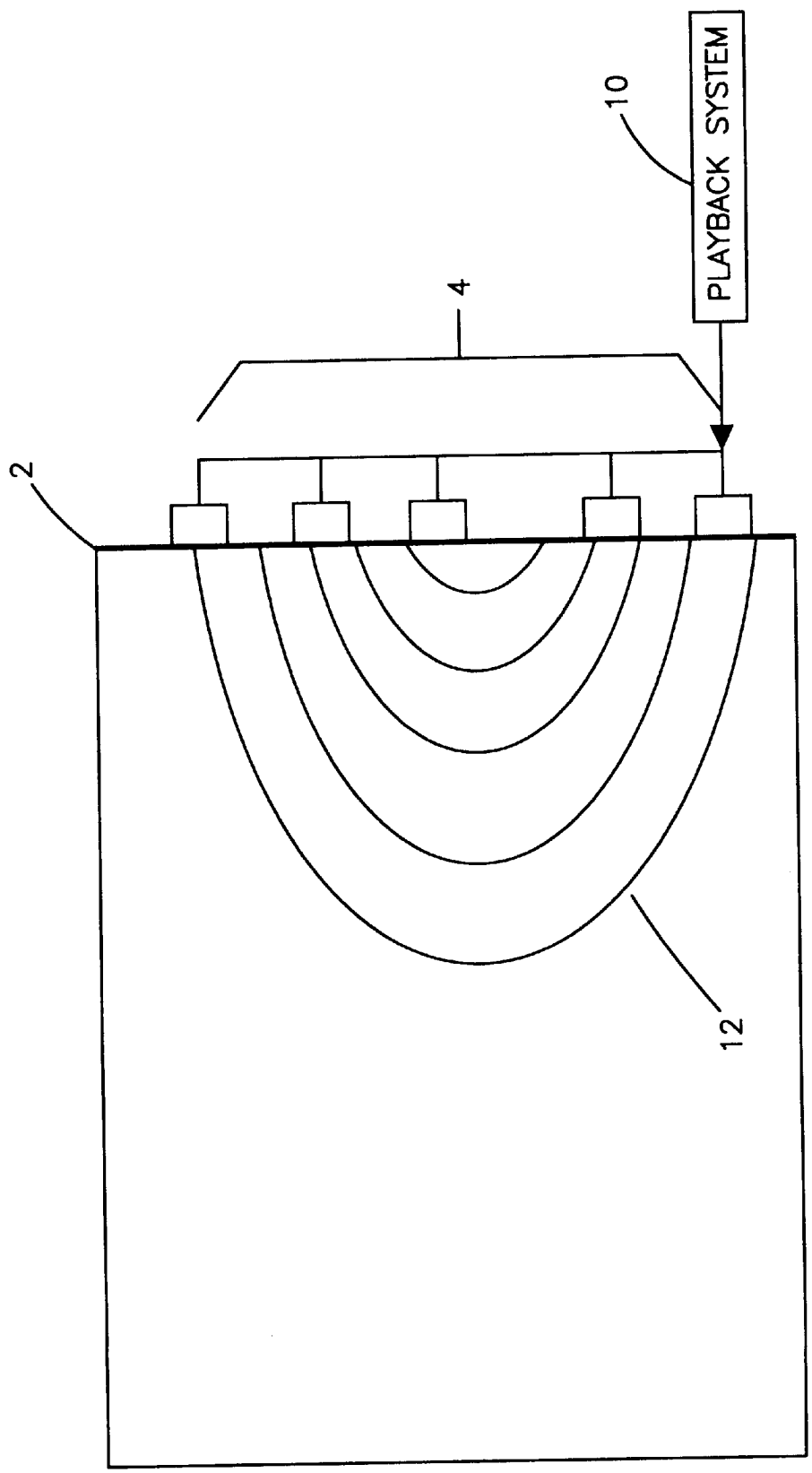
FIG. 3B is a block diagram illustrating the conceptual aspects of the playback system according to the present invention.

FIG. 3B is a block diagram illustrating the conceptual aspects of the playback system 10 according to the present invention. During playback, the data streams created by the CAD system 6 are retrieved from the data storage device 8 and then transmitted to the sound pixels 4. These data streams may be synchronized with video material, for example, motion pictures, video disks, video tapes, or digital video data stored on magnetic or optical data storage devices. Each sound pixel 4 contains a full range audio transducer that reproduces acoustical energy 12 under control of the data streams. The data streams are processed by the playback system 10 and the sound pixels 4 to re-create the same characteristics as the modeled acoustical energy 12 striking the virtual surface 16 within the CAD system 6. The acoustical energy 12 radiates from the sound reproducing surface 2 as though a sound source in the VAE 14 were physically present behind the virtual surface 16/sound reproducing surface 2. Moreover, the acoustical energy 12 recreates how the sound source would exist in the VAE 14 with regard to X, Y, and Z location and movement through space over time. Essentially, the sound reproducing surface 2 recreates the interception plane of the virtual surface 16 for presentation to the audience.

The playback of the data streams can be accomplished in either static or dynamic modes. In static mode, the data streams that comprise the audio material are "static" in that they are not altered once completed. The operator simply activates the playback system 18 and the audio material is replayed through the sound pixels 12, possibly in synchronism with an accompanying video program. In static mode, playback is a fairly simple process in that each data stream is simply transmitted to its corresponding sound pixel 4. Sound objects can move through space and locations during playback by sequentially addressing different sound pixels 4 within the data streams.

In dynamic mode, the present invention extends the implementation of static mode to include real-time interaction, thereby creating participatory sound environments. The playback process gets more complex when the system is interactive, because the interactive responses comprises real-time parameters for digital filters that modify the data streams transmitted to the sound pixels 4.

Computer-Aided Design System

Figure 4:
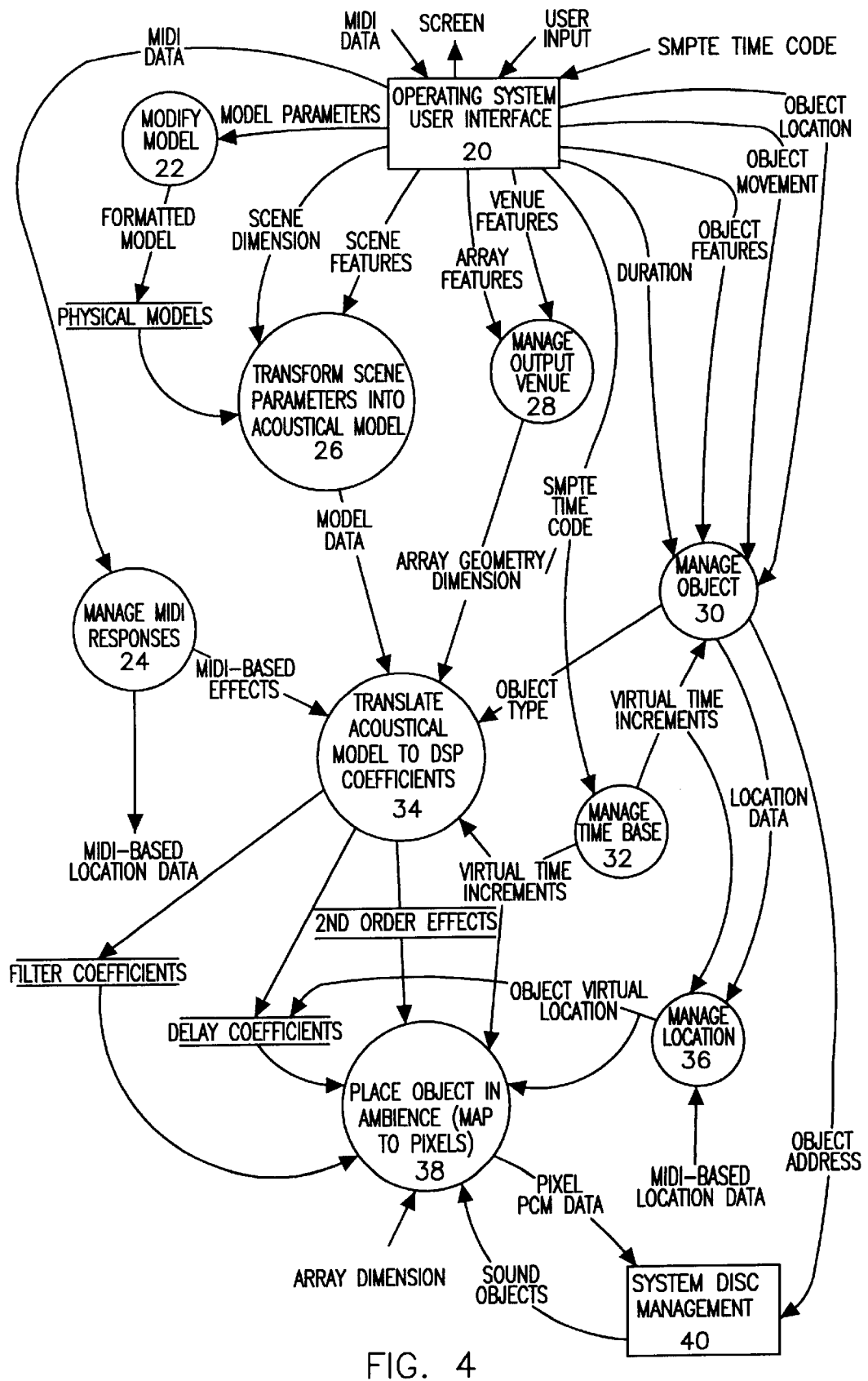
FIG. 4 is a dataflow diagram that further describes the functions of the computer-aided design (CAD) system in the present invention.

FIG. 4 is a dataflow diagram that further describes the functions of the computer-aided design (CAD) system 6 in the present invention. The sound designer first creates a graphical representation of the VAE 14. This is accomplished in a manner similar to prior art CAD systems by specifying dimensions, characteristics and parameters describing the VAE 14, including information relating to the perspective of the audience. These values may be specified by selecting values from a library of various acoustical characteristics such as reflection and absorption, or by selecting environments from a library of VAEs 14 such as "listening rooms," "theaters," "concert halls," or other typical acoustical environments. In addition, these values may be derived empirically, for example, by sampling the frequency response of a similar space over time and frequency. The values specified for a VAE form the basis of the computations performed by the CAD system 6 that result in the data streams used to control the sound pixels 4 in the sound reproducing surface 2.

The CAD system 6 of the present invention comprises an operating system and user interface 20, application modules 22–38, and system disc management module 40. The operating system and user interface 20 accepts various types of data, including user input, SMPTE time codes, and MIDI data. The operating system and user interface 20 also interacts with the operator and displays various information on a screen.

Initially, the operator specifies various parameters describing the VAE 14 and the sound reproducing surface 2 in the playback venue. Model parameters identify the characteristics of the VAE 14, and are augmented by detailed information on the scene dimensions and features. Array features specify the configuration of a particular sound reproducing surface 2. Venue features are provided to describe characteristics of the playback venue.

Application module 22 is used by the operator to modify the VAE 14 model. In the preferred embodiment, the VAE 14 model can be configured in a number of ways, for example, analytically or empirically. The VAE 14 model may include standardized parameters from a look-up table of previously stored or standardized VAE 14 models. The look-up table may include numerous references to acoustical properties of spaces and materials.

Application module 24 is used by the operator to manage MIDI data input the CAD system 6. Typically, application module 24 generates MIDI-based location data and MIDI-based effects for use within the VAE 14.

The VAE 14 model is used by application module 26 to transform parameters such as the scene dimension and scene features into an acoustical model. The application module 24 can display a visual representation of this acoustical model for the operator.

Application module 28 accepts parameters for sound pixel 4 array features and venue features to generate data representing venue acoustics and array geometry/dimensions. The array geometry/dimensions describe the configuration of the venue surfaces, which can be flat or circular surfaces, so that the acoustical energy can be accurately mapped onto the sound pixels 4. In addition, the geometry/dimensions describe the prospective of the audience in the venue. Venue acoustics may represent the frequency responses of the various materials in the venue.

Once the VAE 14 is modeled to the satisfaction of the operator, sound objects can be placed and manipulated within the VAE 14. Application module 30 provides the general functions for managing sound objects. For example, when creating a new sound object, the application module 30 accepts data representing the object features, object movement, object location and duration.

Application module 32 manages the time base for all activities in the VAE 14. For example, all movement and action of sound objects in the VAE 14 are identified by a time line reference. Application module 32 also accepts SMPTE time codes to synchronize the sound objects to external events. Application module 32 produces virtual time increments for use by other modules in synchronizing and referencing activities within the VAE 14.

Application module 34 translates the acoustical model into the digital signal processor (DSP) coefficients and programming necessary to drive the sound pixels 4. These DSP coefficients and programming include filter coefficients, second order effects, and delay coefficients. Application module 34 also uses the venue acoustics and geometry/dimensions to achieve this function.

Application module 36 manages the location of sound objects in the VAE 14 using location data from application module 30, virtual time increments from application module 32, and MIDI-based location data from application module 24. Application module 36 produces object virtual location data which is used to modify the delay coefficients.

Application module 38 is used to place sound objects in the ambience of the VAE 14, i.e., it maps sound objects to sound pixels 4 in accordance with the time line reference indicated by the virtual time increments. Application module 38 accepts filter coefficients, delay coefficients, second order effects, virtual timing increments, object virtual locations, sound objects, and array dimensions to perform these functions. Application module 38 transforms this data to create PCM data for the sound pixels 4, which may be compressed and then stored as discrete data streams for later decompression and retrieval by system disc manager 40. System disc manager 40 also retrieves sound objects from storage for manipulation by application module 38.

Sound Reproducing Surface

Figure 5:
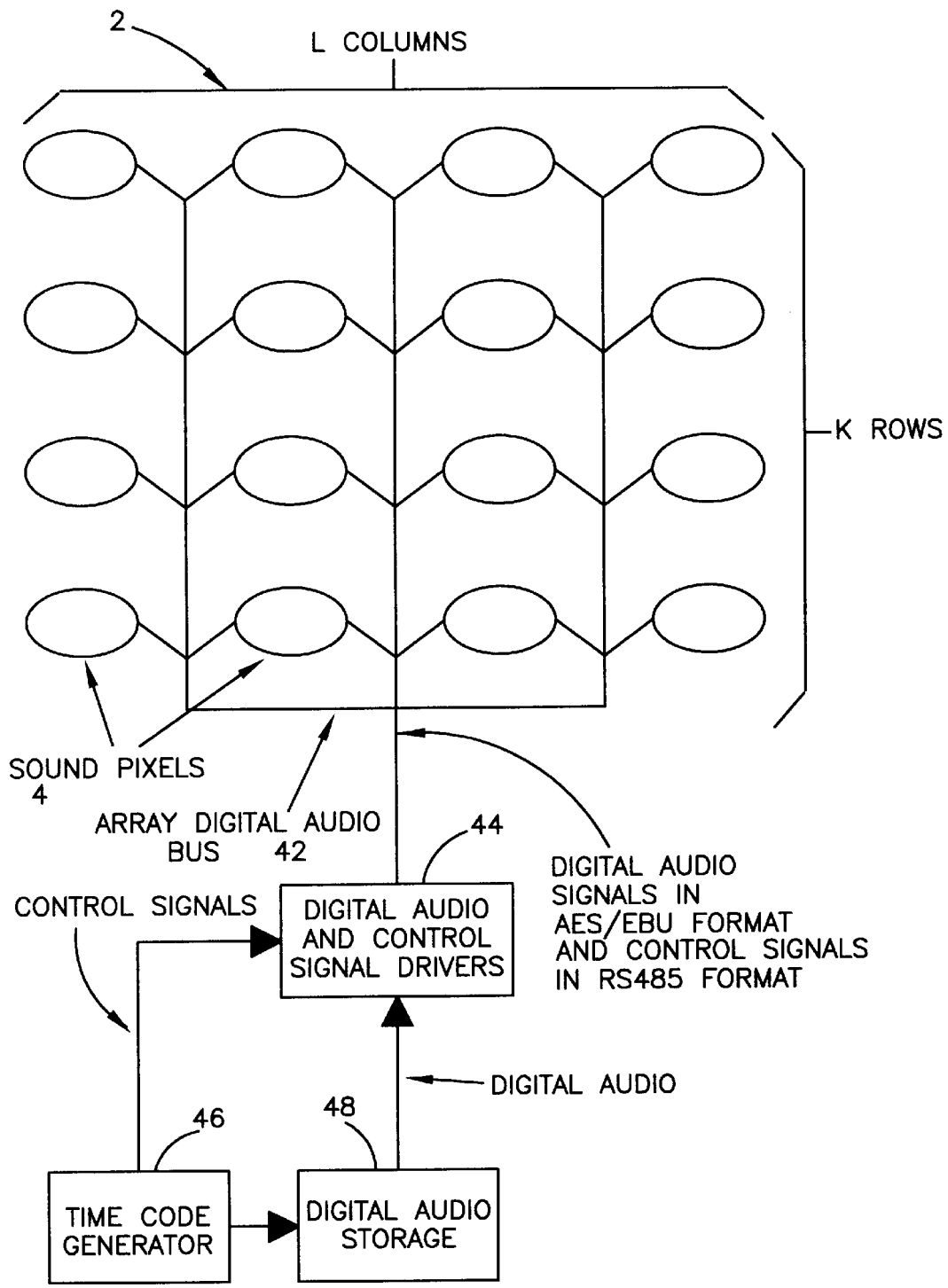
FIG. 5 is a block diagram illustrating the components of the sound reproducing surface and its electronics, wherein playback occurs in a static mode.

FIG. 5 is a block diagram illustrating the components of the sound reproducing surface 2 and its electronics, wherein playback occurs in a static mode. In static mode, the energy dispersion profiles and object location parameters assigned by the CAD system 6 are fixed and do not respond to changes in real-time conditions. Static mode provides a bare-bones embodiment of the present invention, wherein the focus is on solving the basic system problems, providing a solid foundation for other embodiments, and yet creating very sophisticated sound reproduction.

The sound reproducing surface 2 has a plurality of addressable sound pixels 4, typically comprising audio transducers arranged in a matrix of L columns and K rows. The pixels 4 are coupled via bus 42 to digital and audio and control signal drivers 44. A time code generator 46 is coupled to the drivers 44 as well as a digital audio storage device 48, which can be any commercial device for storing the data streams such as a CD-ROM or a hard disk. The data streams are read from the digital audio storage device 48 and passed to the drivers 44 to control the operation of pixels 4. Preferably, the drivers 44 transmit digital audio signals to the pixels 4 in AES/EBU format and transmit control signals to the pixels 4 in RS485 format. The time code generator 46 provides a reference clock to both the drivers 44 and the storage device 8 for synchronizing the transmission of the data streams to the pixels 4. The pixels 4 decode and amplify the digital audio signals in accordance with the control signals. Essentially, the sound pixels 4 provide a distributed active speaker array with integral digital-to-analog converters.

The sound reproducing surface 2 is preferably deformable and thus the sound pixels 4 can be arranged into any 2-dimensional or 3-dimensional configuration. In some high-end video venues, the surface 2 may be curved in an arc of 270 degrees or more to correspond to the curvature of a screen. In other applications, such as in theme parks, the surface 2 may be curved into a spherical shape. On the other hand, some installations may only need a surface 2 with a flat, planar shape. The point is that playback architecture is flexible enough to accommodate a wide range of requirements.

The number of sound pixels 4 comprising the sound reproducing surface 2 is also flexible. As with an imaging system, the larger the number of energy producing elements, the greater the resolution of the reconstructed "acoustical image." In the present invention, some applications may require only a small number of pixels 4, while other applications may require large numbers of pixels 4. Typically, the number of sound pixels 4 will not be a function of physical constraints, but rather of cost and space considerations. In more advanced "virtual reality" systems, it is conceivable that there could be many thousands of sound pixels 4 incorporated into a sound reproducing surface that encloses participants in a 360 degree sphere for complete realism in sound reproduction.

Figure 6:
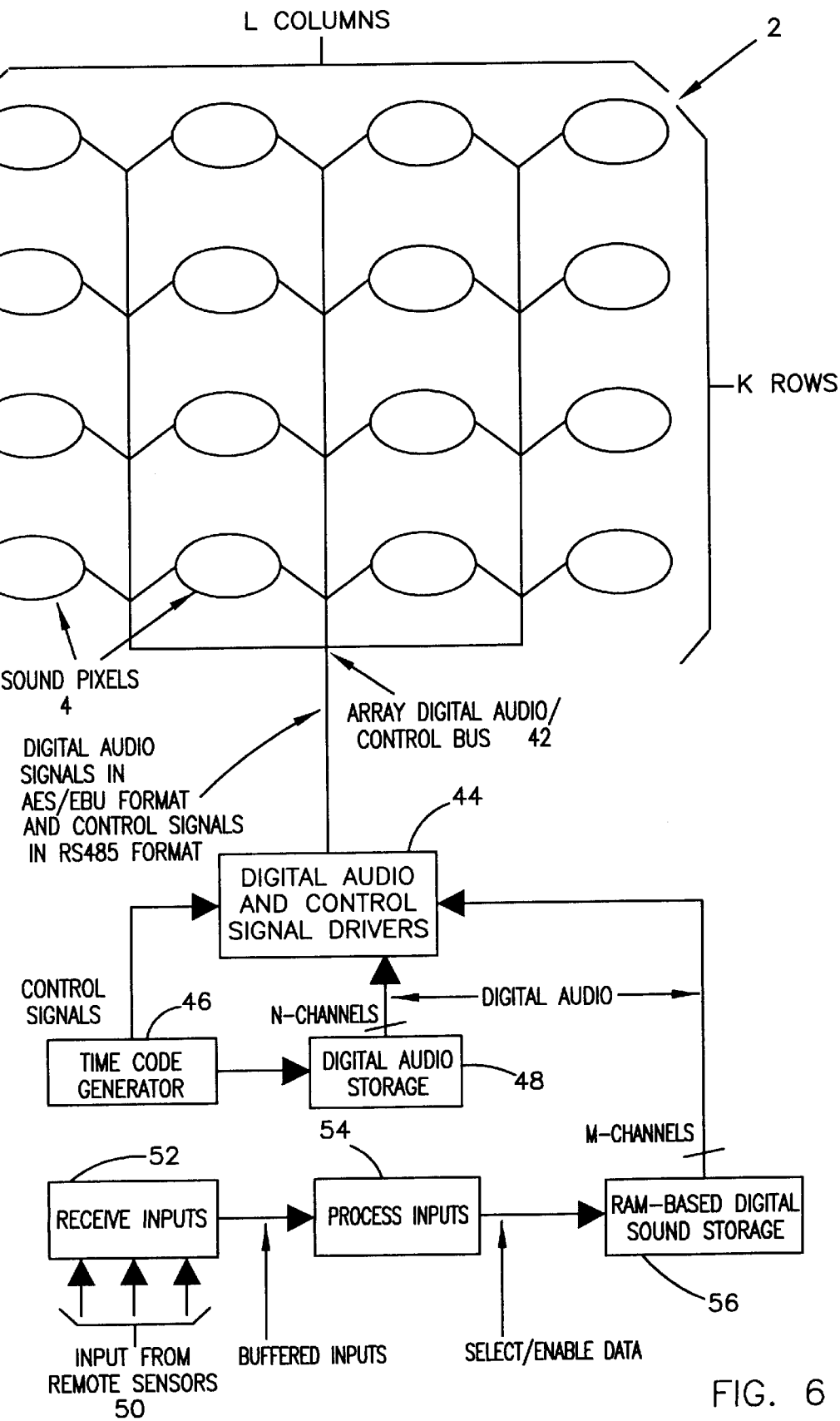
FIG. 6 is a block diagram illustrating the components of the sound reproducing surface and its electronics, wherein playback occurs in a static mode with responsive inputs.

FIG. 6 is a block diagram illustrating the components of the sound reproducing surface 2 and its electronics, wherein playback occurs in a static mode with responsive inputs. For example, one embodiment of the invention would be to add input from remote sensors 50 which could be a control pad or joy stick, infrared sensors, ultrasound sensors, or other apparatus well known in the art. The inputs from these remote sensors 50 would be received at 52 and processed at 54 to provide select/enable signals for determining which data streams are retrieved from a data storage device 56. The data streams retrieved from the digital storage 56 would be combined with or controlled or modified by the data streams retrieved from the storage device 48.

Figure 7:
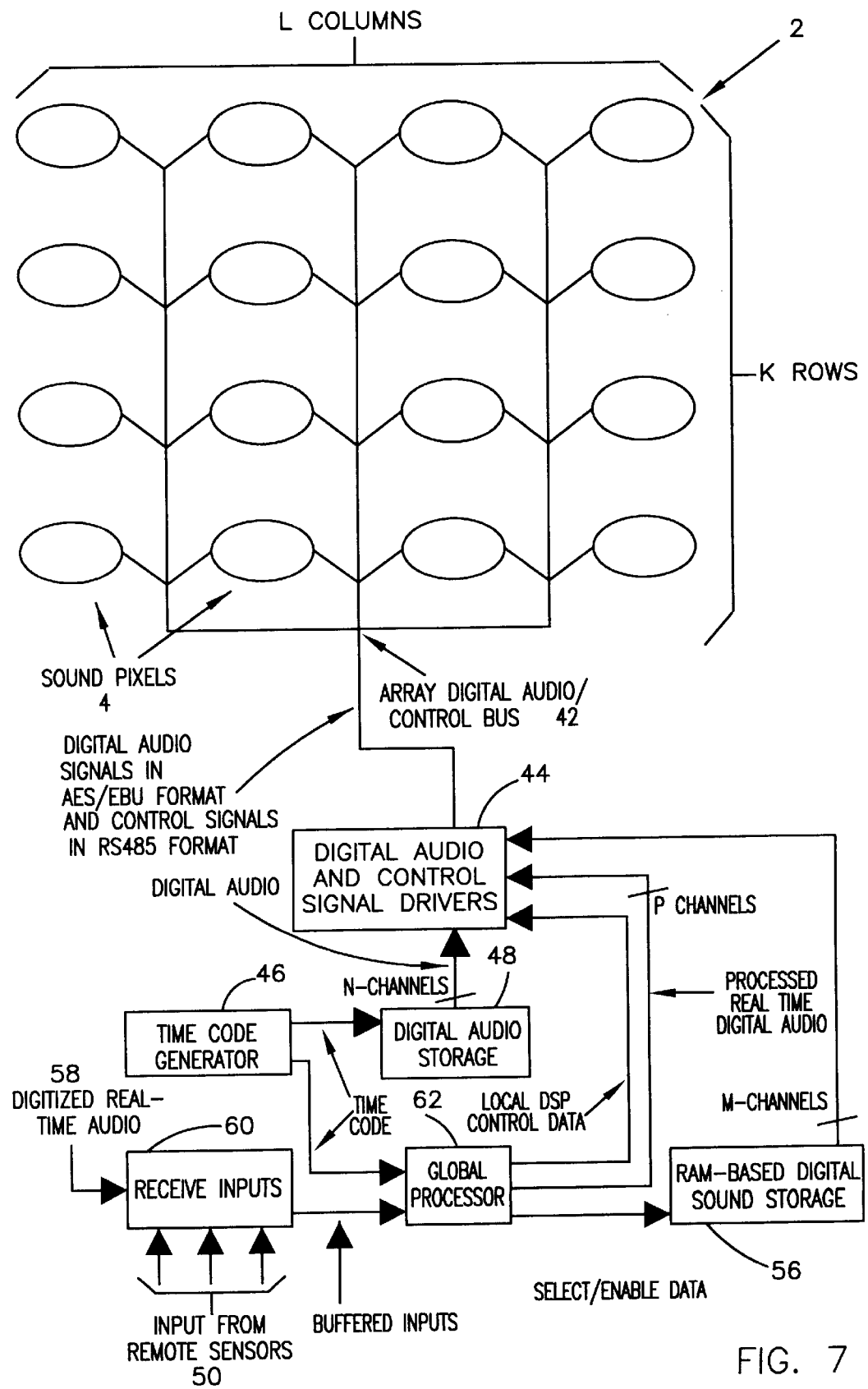
FIG. 7 is a block diagram illustrating the components of the sound reproducing surface and its electronics, wherein playback occurs in a dynamic mode with responsive inputs and real-time audio.

FIG. 7 is a block diagram illustrating the components of the sound reproducing surface 2 and its electronics, wherein playback occurs in a dynamic mode with responsive inputs and real-time audio. For example, one embodiment of the invention would be to add digitized real-time audio 50 from one or more microphones. These real-time inputs 50, as well as the inputs from the remote sensors 50, would be received at 60 and processed at 62 to provide select/enable signals for determining which data streams are retrieved from the data storage device 58. Further, processor 62 can generate local DSP control data and P channels of real-time audio data streams. The data streams retrieved from the digital storage 48 and the storage device 56 could be combined with the real-time audio data streams.

Figure 8:
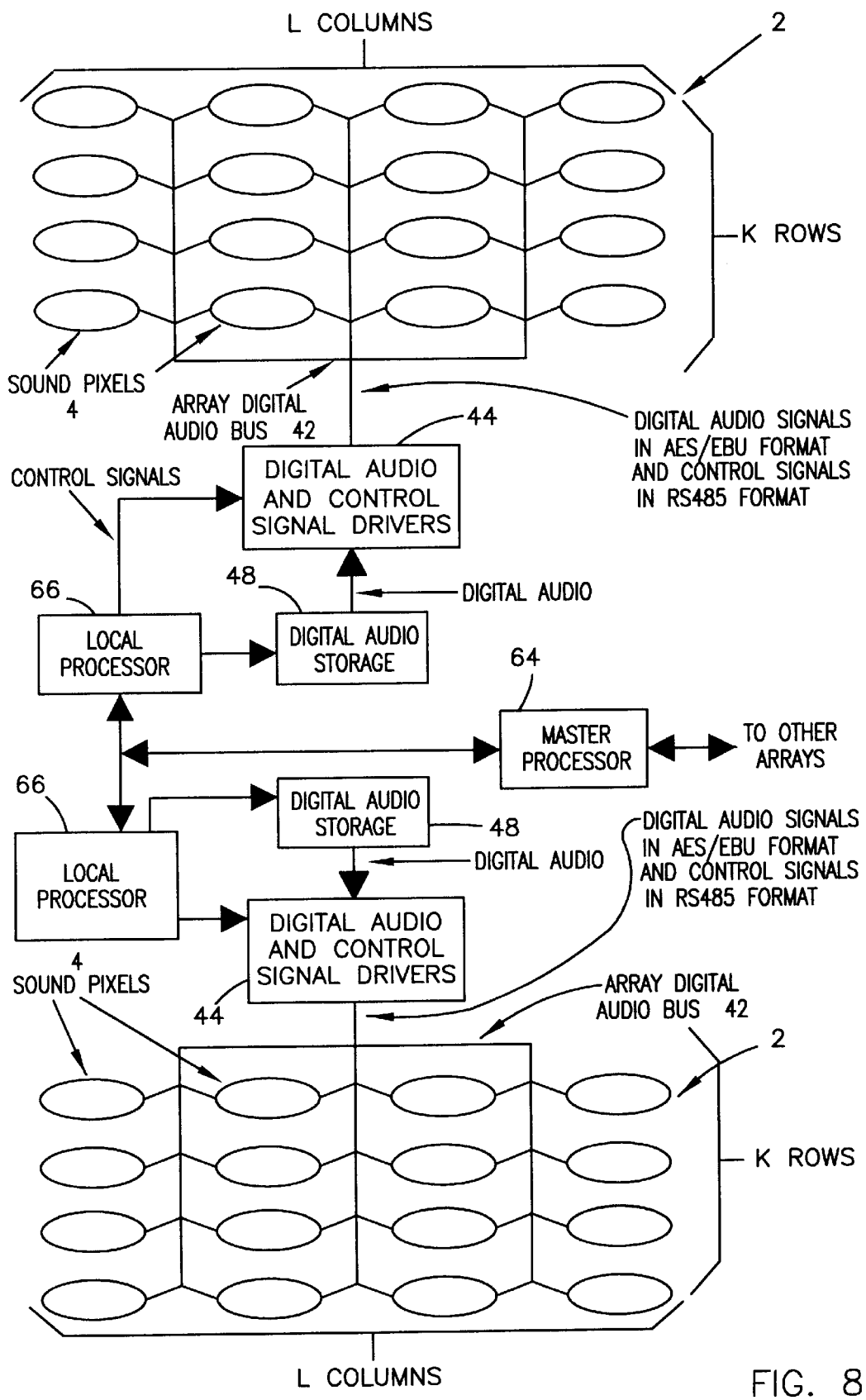
FIG. 8 is a block diagram illustrating the components and interconnections of a plurality of sound reproducing surfaces.

FIG. 8 is a block diagram illustrating the components and interconnections of a plurality of sound reproducing surfaces 2. A master processor 64 is interconnected to a plurality of playback systems and controls the interaction therebetween. The master processor 64 is coupled to a local processor 66 controlling a particular array of sound pixels 4. Each local processor 66, in turn, is coupled to digital audio and control signal drivers 44, and digital audio storage 48.

Figure 9:
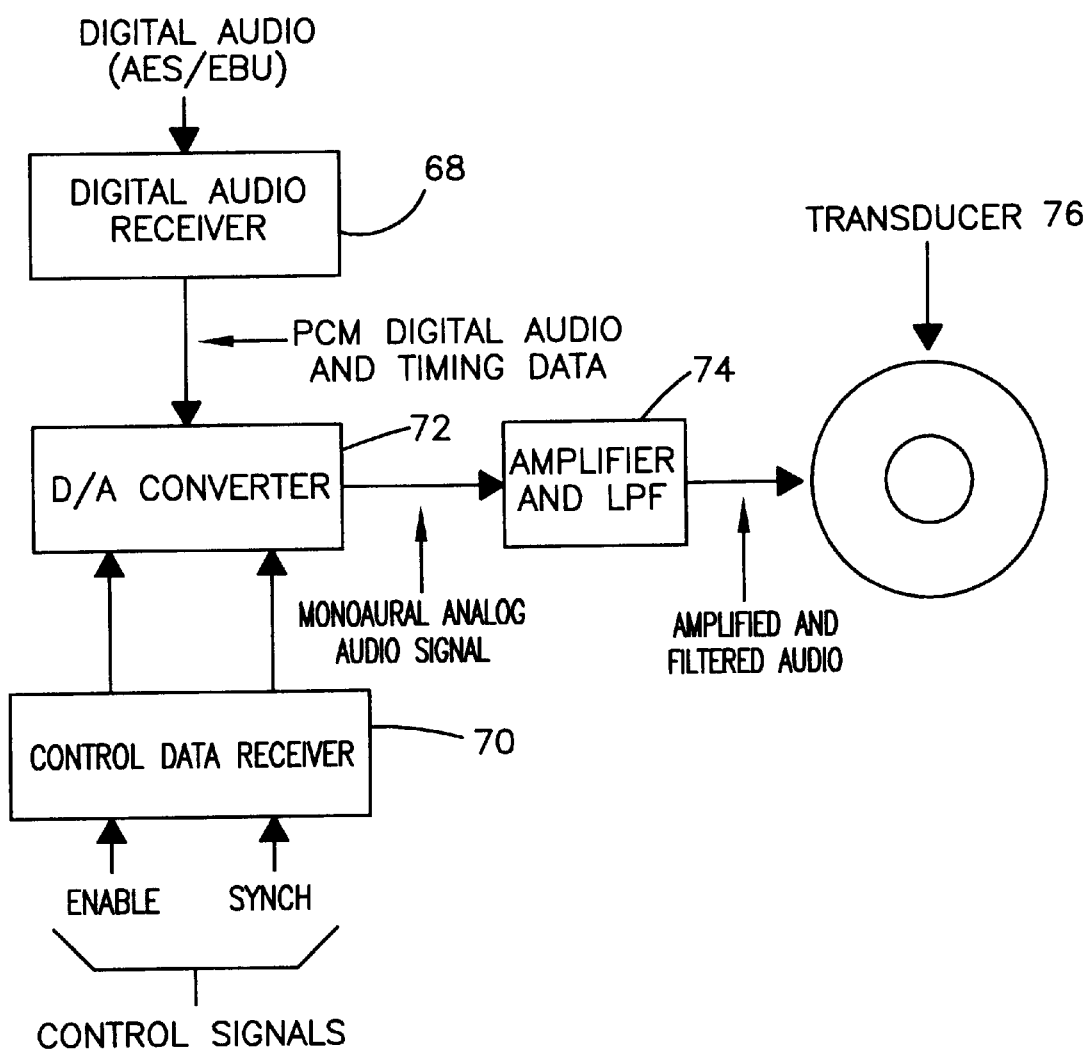
FIG. 9 is a block diagram illustrating the components of a static sound pixel using global digital signal processing.

FIG. 9 is a block diagram illustrating the components of a static sound pixel 4 using global signal processing. The sound pixel 4 receives digital audio data at a receiver 68 and control signals at a receiver 70. The digital audio receiver 68 processes and transforms the digital audio signals into pulse code modulation (PCM) digital audio and timing data. The control data receiver 70 processes the control signals, which are comprised of enable and synchronization data, and transmits the enable and synchronization signals to the D/A converter 72. The D/A converter 72 transmits a monaural analog audio signal to an amplifier and low pass filter (LPF) 74 for driving the transducer 76 of the sound pixel 4.

Figure 10:
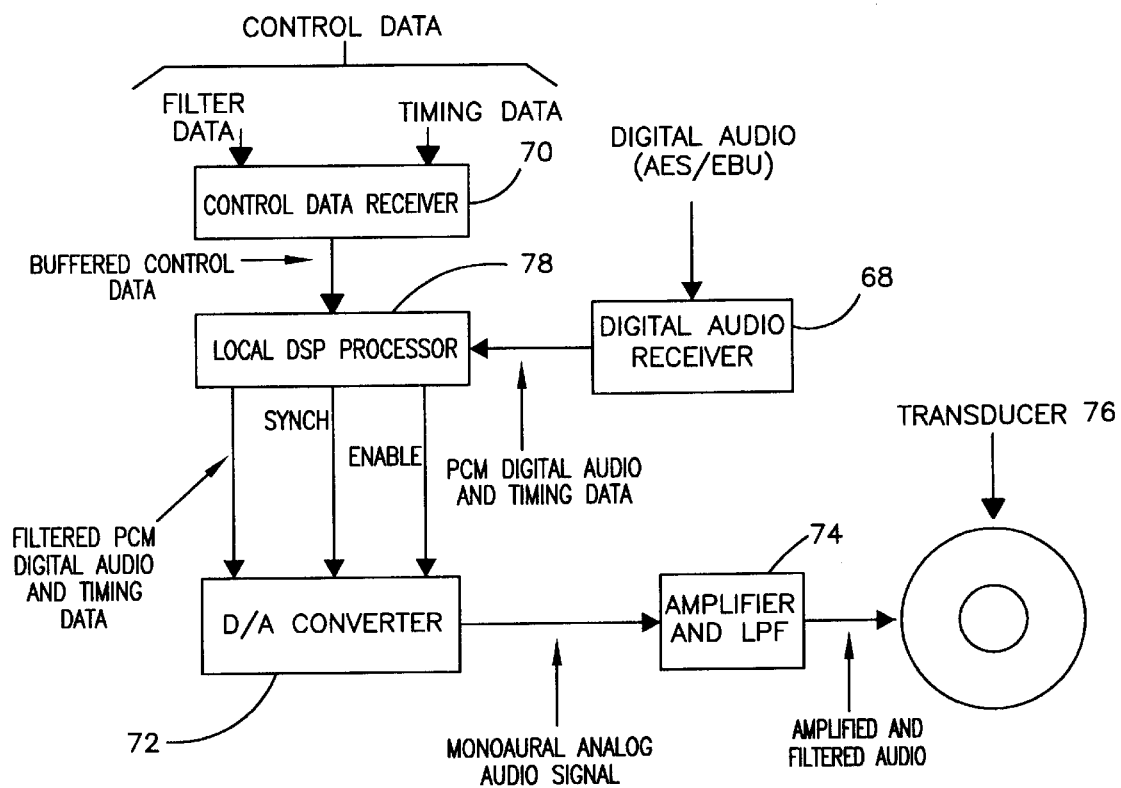
FIG. 10 is a block diagram illustrating the components of a dynamic sound pixel using local digital signal processing.

FIG. 10 is a block diagram illustrating the components of a dynamic sound pixel 4 using local digital signal processing. In this embodiment, a local DSP 78 processes the digital audio data and control signals. The DSP 78 transforms the digital audio signals and control data into PCM digital audio and timing data, synchronization data, and enable data, for transmission to the D/A convertor 72.

Figure 11:
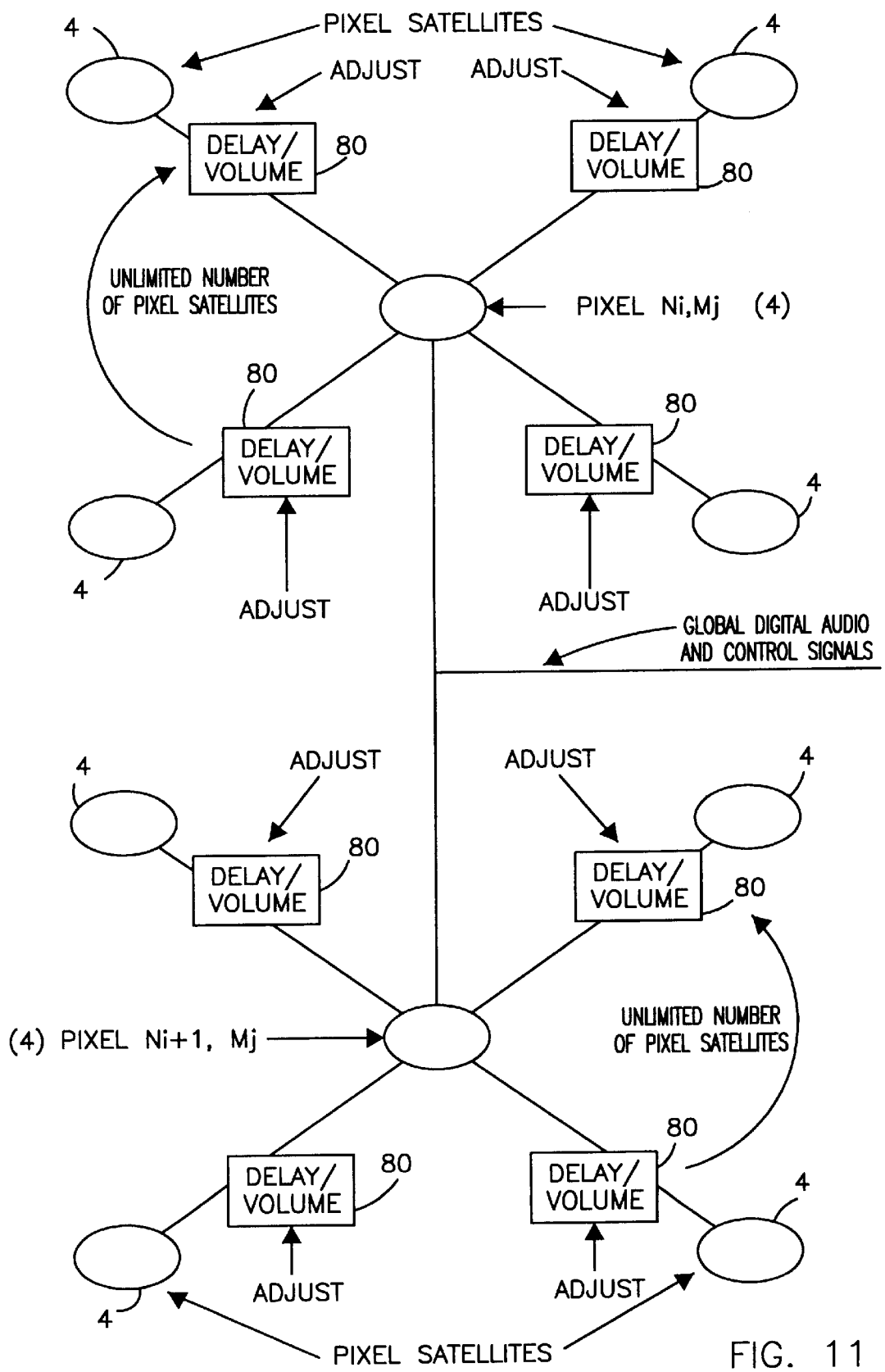
FIG. 11 is a block diagram illustrating the components of a satellite network for sound pixels.

FIG. 11 is a block diagram illustrating the components of a satellite network for sound pixels 4. In this embodiment, digital audio and control signals transmitted to "master" sound pixels 4 are simultaneously provided to "satellite" sound pixels 4. Satellite sound pixels 4 include components 80 to alter or other process the data streams transmitted to the master sound pixel 4. The satellite sound pixel 4 may alter characteristics such as gain, delay, or perform filtering of the data streams.

Figure 12:
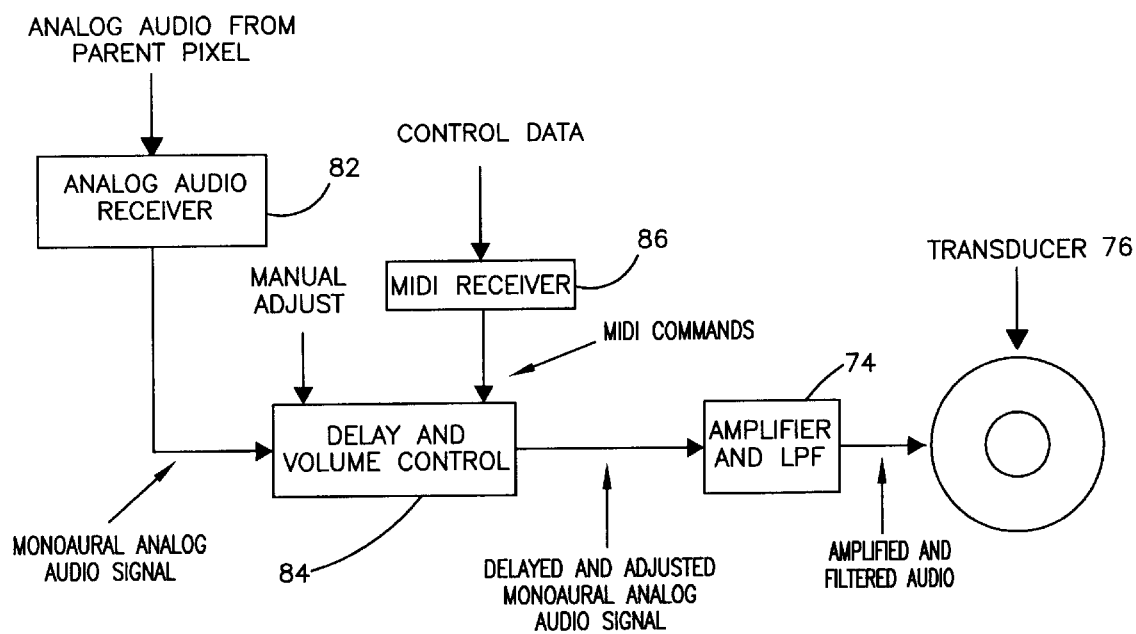
FIG. 12 is a block diagram illustrating the components of a satellite sound pixel with analog signal processing.

FIG. 12 is a block diagram illustrating the components of a satellite sound pixel 4 with analog signal processing. In this embodiment, the satellite sound pixel 4 receives analog audio signals from the master sound pixel at receiver 82. The analog audio signals are modified by a delay and volume control circuit 84. The delay and control circuit 84 is controlled by a manual adjust or by MIDI commands received by receiver 86. The output of the delay and volume control circuit 84 is amplified and filtered at 74 before driving the transducer 76.

Figure 13:
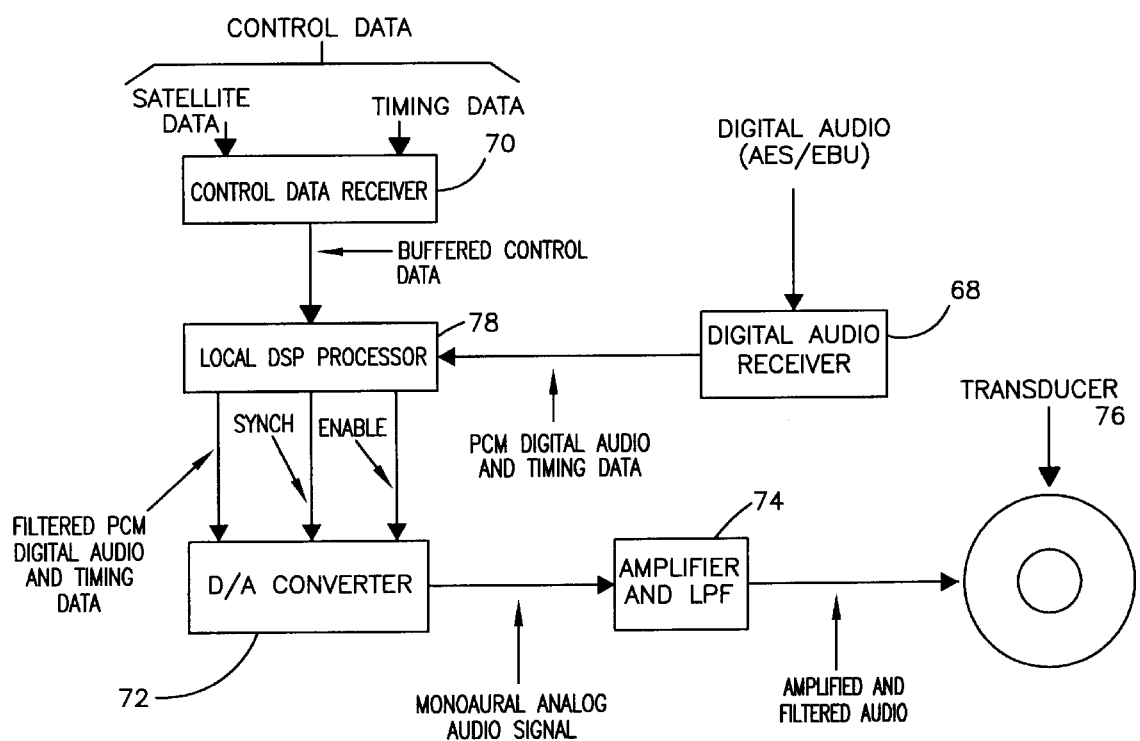
FIG. 13 is a block diagram illustrating the components of a satellite sound pixel with analog signal processing.

FIG. 13 is a block diagram illustrating the components of a satellite sound pixel 4 with analog signal processing. In this embodiment, a local DSP 78 processes the digital audio data and control signals transmitted to the master sound pixel. The DSP 78 transforms the digital audio signals and control data into PCM digital audio and timing data, synchronization data, and enable data, for transmission to the D/A converter 72, amplifier and low pass filter 74, and transducer 76.

Figure 14:
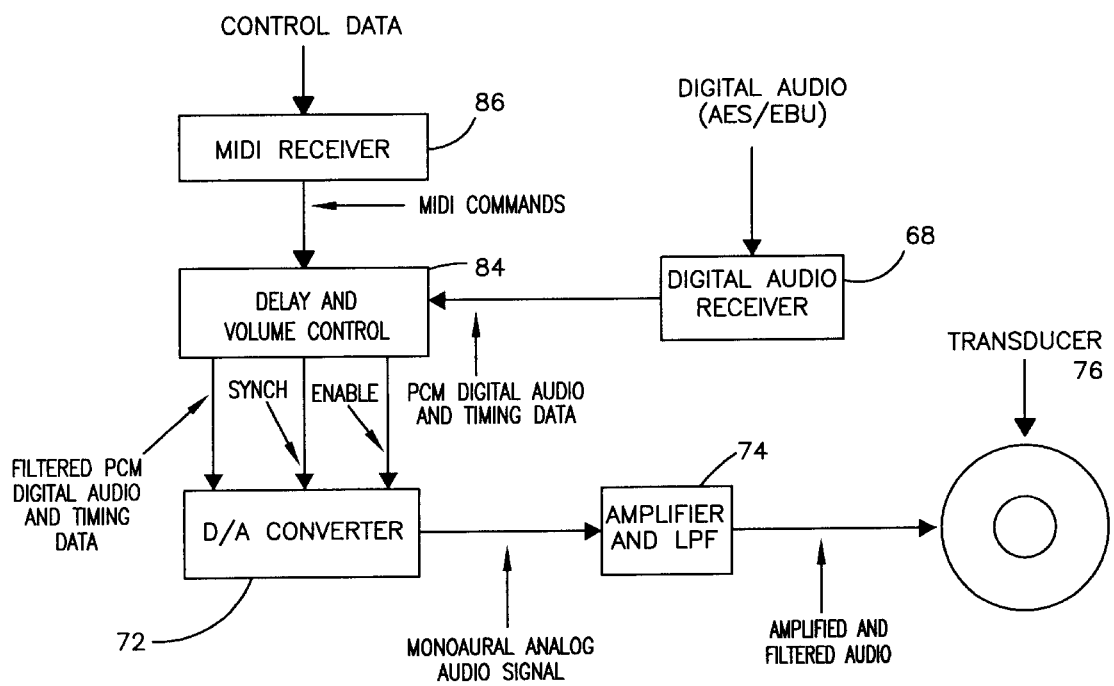
FIG. 14 is a block diagram illustrating the components of a satellite sound pixel utilizing digital processing and having a MIDI interface.

FIG. 14 is a block diagram illustrating the components of a satellite sound pixel 4 utilizing digital processing and having a MIDI interface. In this embodiment, MIDI commands received by a MIDI receiver 86 are used to control the delay and volume control circuit 84.

Figure 15:
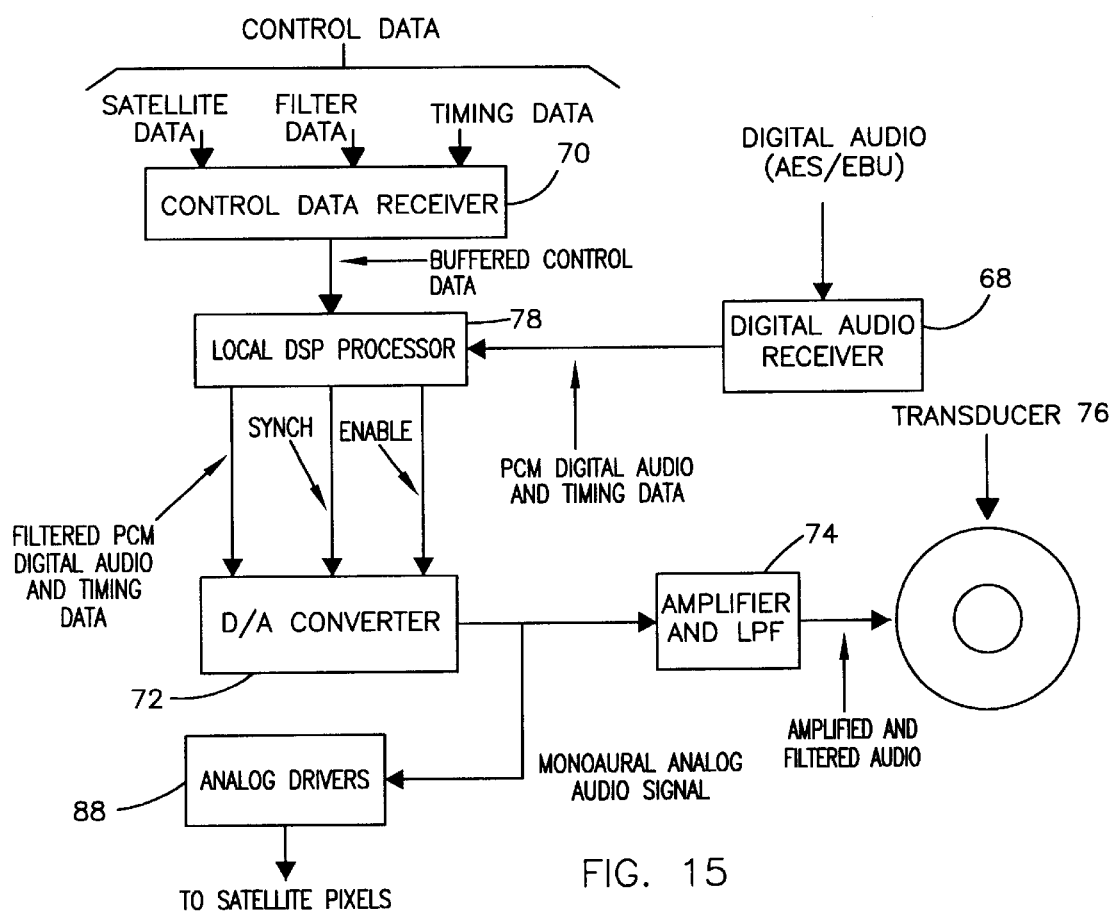
FIG. 15 is a block diagram illustrating the components of a satellite sound pixel utilizing digital processing and having analog output to other satellite sound pixels.

FIG. 15 is a block diagram illustrating the components of a satellite sound pixel 4 utilizing digital processing and having analog output to other satellite sound pixels 4. In this embodiment, a local DSP 78 processes the digital audio data and control signals transmitted to the master sound pixel 4. The control signals include satellite data, filtering data, and timing data. The DSP 78 transforms the digital audio signals and control data into PCM digital audio and timing data, synchronization data, and enable data, for transmission to the D/A converter 72. The output of the D/A converter 72 is used to drive the amplifier and low pass filter 74 and transducer 76, as well as being shared with other satellite sound pixels 12 via analog drivers 88.

Figure 16:
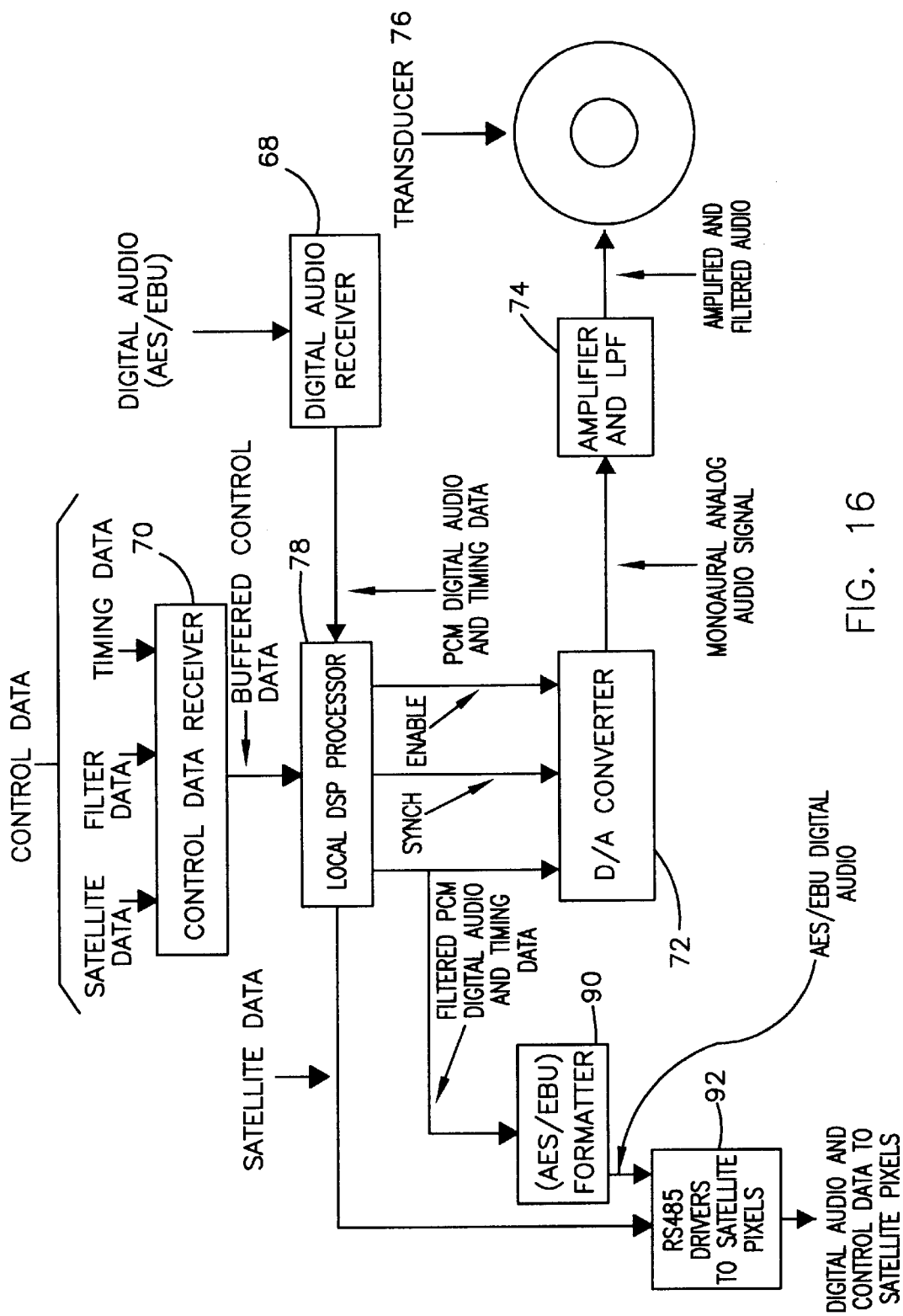
FIG. 16 is a block diagram illustrating the components of a satellite sound pixel utilizing digital processing and having digital output to other satellite sound pixels.
Figure 17A:
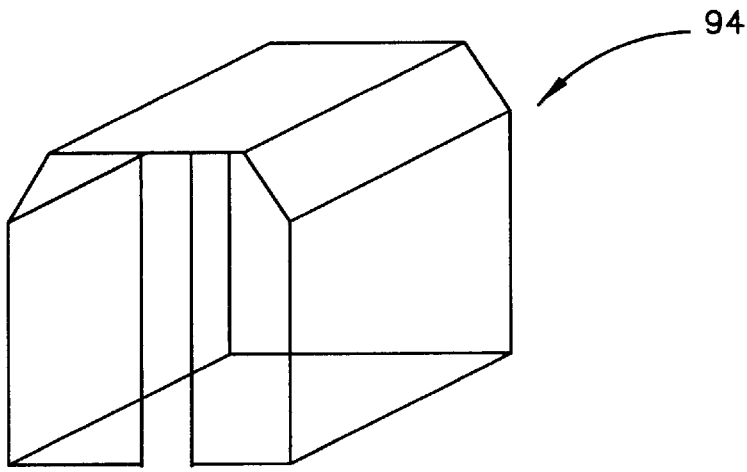
FIGS. 17A–17D are block diagrams illustrating various perspective views of a sound bubble constructed according to the teachings of the present invention.
Figures 17B, 17C:
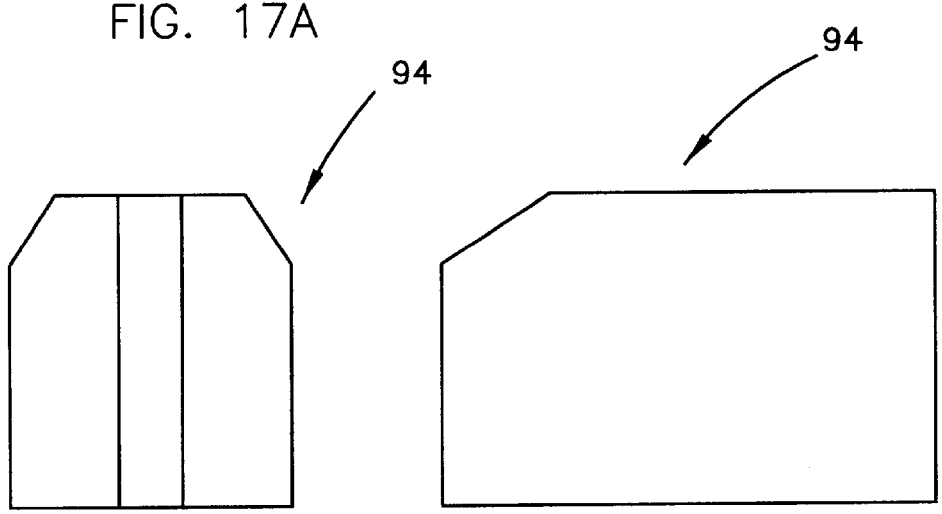
Figure 17D:
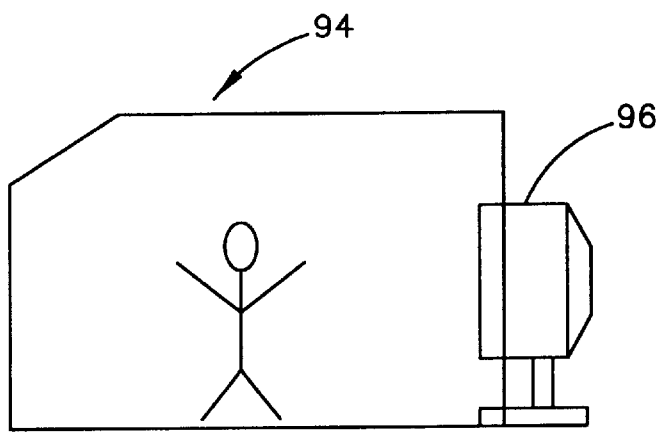

FIG. 16 is a block diagram illustrating the components of a satellite sound pixel 4 utilizing digital processing and having digital output to other satellite sound pixels 4. In this embodiment, the local DSP 78 outputs filtered PCM digital audio and timing data to an AES/EBU formatter 90 and RS485 driver 92, as well as the D/A converter 72.

Sound Bubble

FIGS. 17A–17D are block diagrams illustrating various perspective views of a sound bubble 94 constructed according to the teachings of the present invention. The walls of the sound bubble 94 are formed by the sound reproducing surface 2 of the present invention. Generally, the surface 2 will comprise a fabric incorporating various numbers of sound pixels 4. Moreover, the enclosure may include a monitor 96 for use in generating video images. The sound bubble 94 is primarily intended to provide audio enhancement to video-based entertainment. Another embodiment would incorporate the sound bubble 94 into a helmet or visor or other similar personal device, wherein it is intended that the sound pixels 4 in a helmet would remain stationary, so that sounds remain fixed in position regardless of head movement.

Figure 18A:
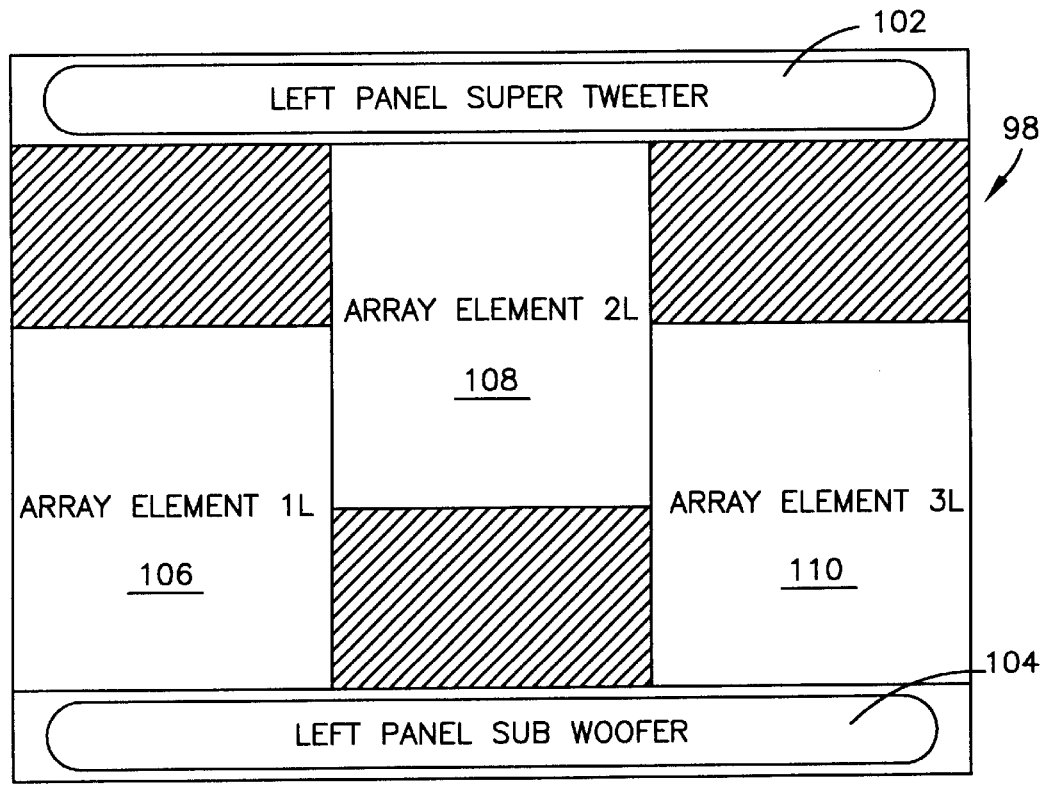
FIGS. 18A and 18B show the left panel and right panel of the sound bubble.
Figure 18B:
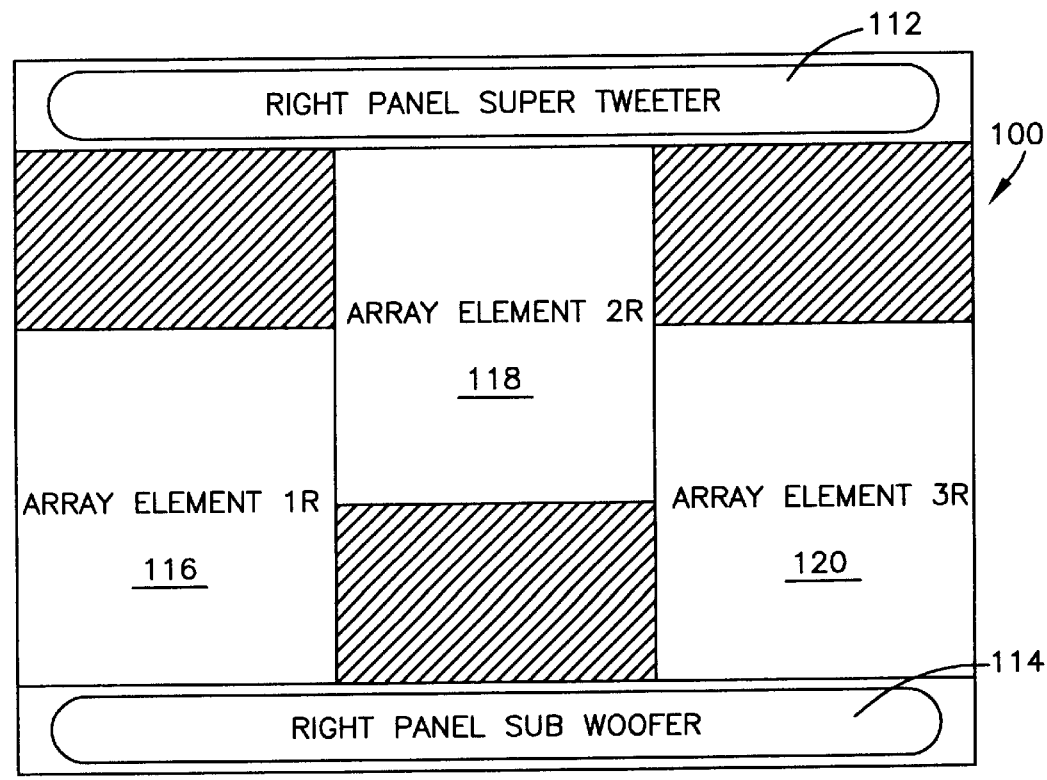

FIGS. 18A and 18B show the left panel 98 and right panel 100 of the sound bubble 94, which can include a soft speaker configuration. The left panel 96 includes a super tweeter 102 and sub woofer 104. Between the super tweeter 102 and sub woofer 104 are array elements or sound pixels 106–110 (also labeled as 1L, 2L, and 3L). The right panel 100 also includes a super tweeter 112 and sub woofer 114 and array elements or sound pixels 116–120 (also labeled as 1R, 2R, and 3R).

Figure 19:
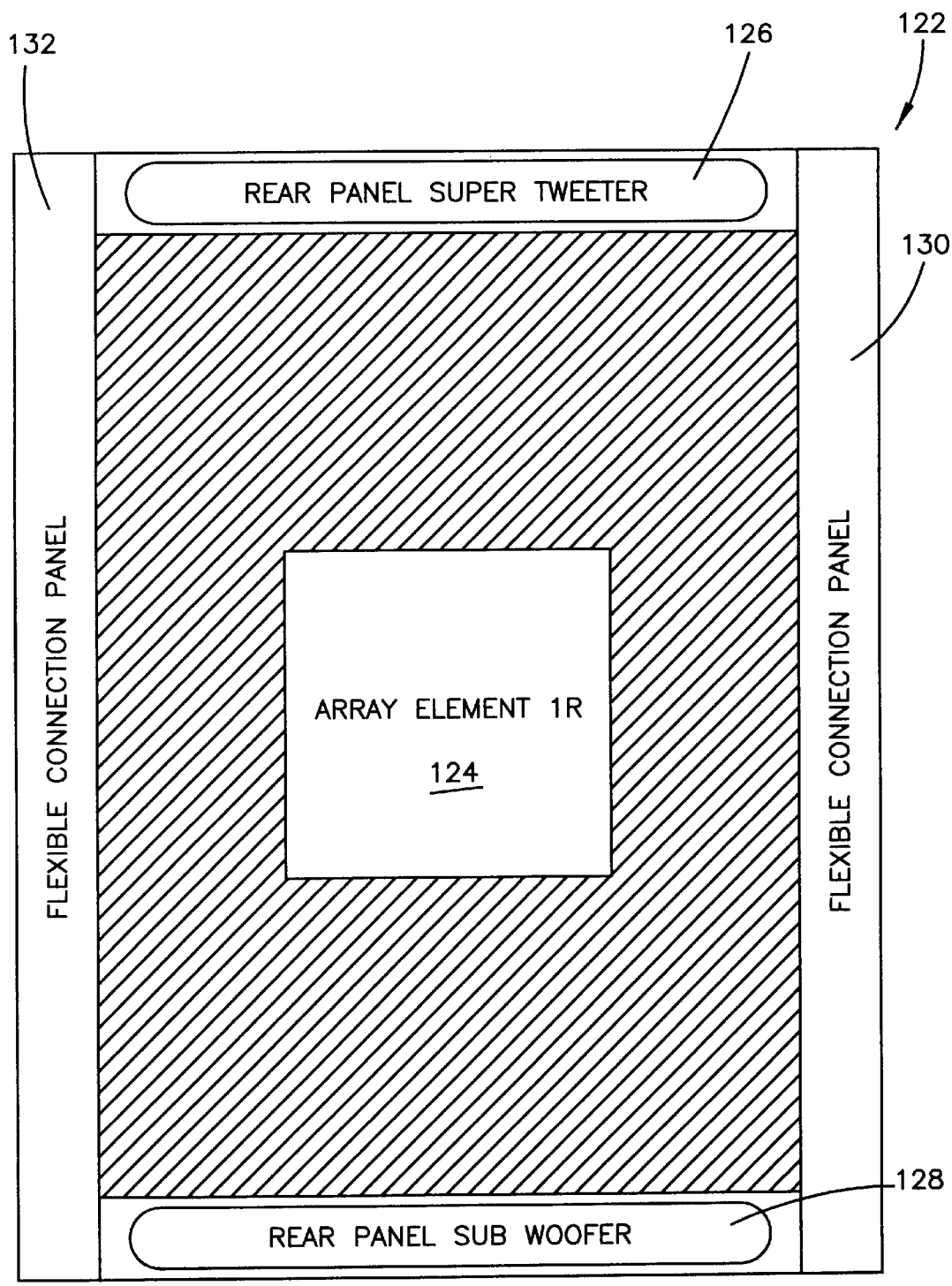
FIG. 19 shows the rear panel of the sound bubble.

FIG. 19 shows the rear panel 122 of the sound bubble 94, which has one array element or sound pixel 124 (also labeled as 1R) located between a super tweeter 126, a sub woofer 128, and two flexible electrical connection panels 130 and 132.

Figure 20:
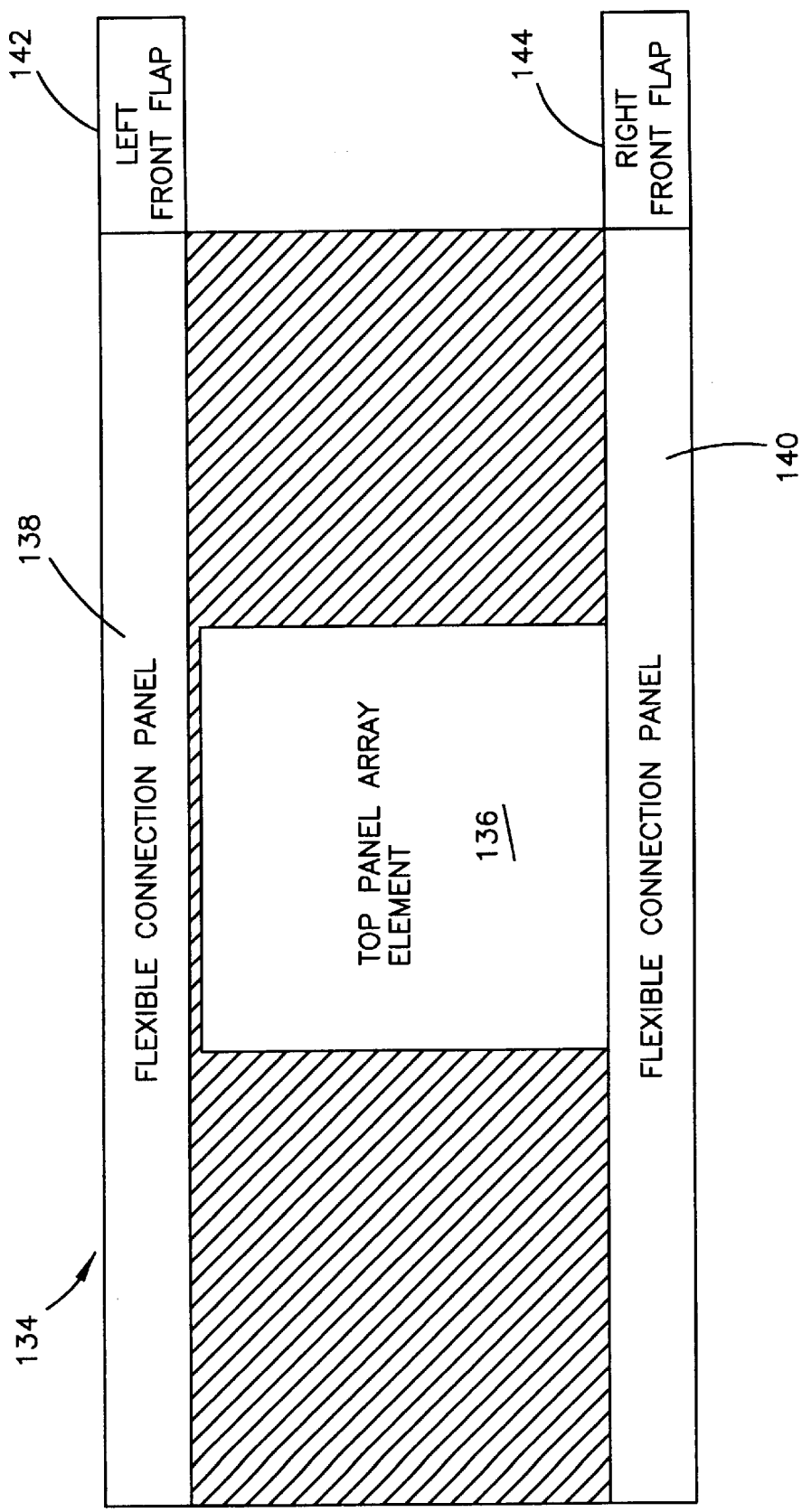
FIG. 20 shows the top panel of the sound bubble.

FIG. 20 shows the top panel 134 of the sound bubble 94, which has one array element or stand pixel 136 located between two flexible connection panels 138 and 140 on each respective side of top panel 134. The flexible connection panels 138 and 140 each have a front flap 142 and 144 respectively located at an end.

Sound Bubble Electronic Components

Figure 21:
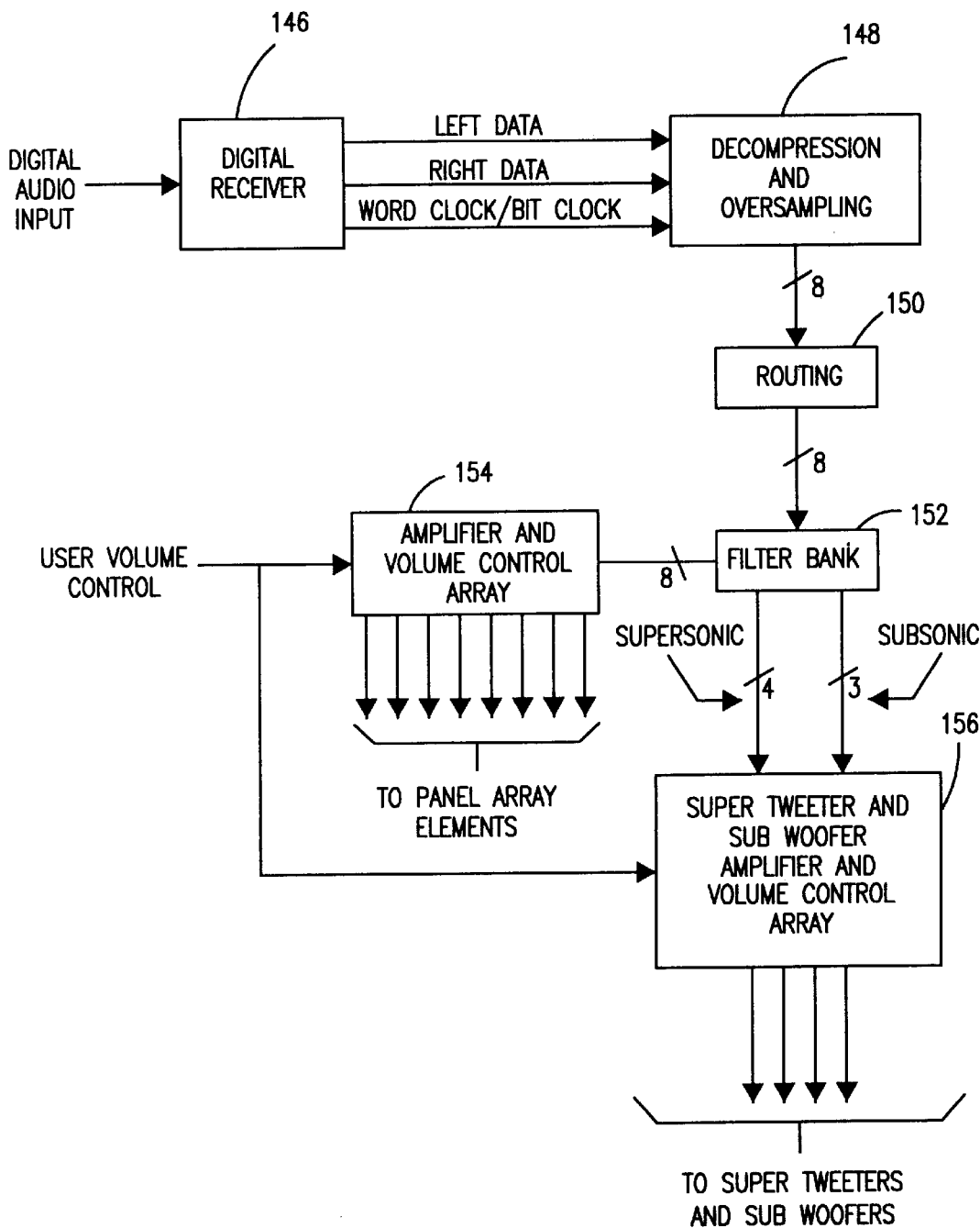
FIG. 21 is a block diagram of the electronic components used to control the operation of the sound bubble.

FIG. 21 is a block diagram of the electronic components used to control the operation of the sound bubble 94. The input typically comprises digital audio input received from, for example, a video disk, VHS tape, CD-ROM or other optical disk drive, magnetic disk drive, or game cartridge. The digital audio is fed into a digital receiver 146, which processes and transforms the digital audio input into left data, right data, and word clock/bit clock. All data processed by digital receiver 146 is sent to a decompression and oversampling device 148. The decompression and oversampling device 148 then processes and transforms the left data, right data, and word clock/bit clock into an 8 bit digital signal, which is sent to a routing device 150 which routes the 8 bit digital signals to a filter bank 152. The filter bank 152 generates eight signals for the array elements, four supersonic signals for the super tweeters, and three subsonic signals for the sub woofers. The eight signals for the array elements are sent to an amplifier and volume control array 154, which also receives user volume control input. The amplifier and volume control array 154 produces signals for the array elements or sound pixels 4. The four supersonic signals for the super tweeters and the three subsonic signals for the sub woofers are sent to super tweeter and sub woofer amplifier and volume control array 156, which also receives user volume control input. The super tweeter and sub woofer amplifier and volume control array 156 mixes the user volume control input, supersonic signals, and subsonic signals and sends the resulting signals to the super tweeters and sub woofers.

As indicated above, the input to the sound bubble typically comprises digital audio input received from, for example, a video disk, VHS tape, CD-ROM or other optical disk drive, magnetic disk drive, or game cartridge providing AES/EBU formatted data. However, if the video disk, VHS tape, CD-ROM or other optical disk drive, magnetic disk drive, or game cartridge does not provide AES/EBU formatted data, then the electronics can accept, process, and provide surround-sound, stereo and/or monaural audio signals. Conversely, if the video disk, VHS tape, CD-ROM or other optical disk drive, magnetic disk drive, or game cartridge provides AES/EBU formatted data but there is no sound bubble attached to the electronics, then the electronics can translate the AES/EBU formatted data to provide surround-sound, stereo and/or monaural audio signals.

Sound Bubble Applications

Figure 22:
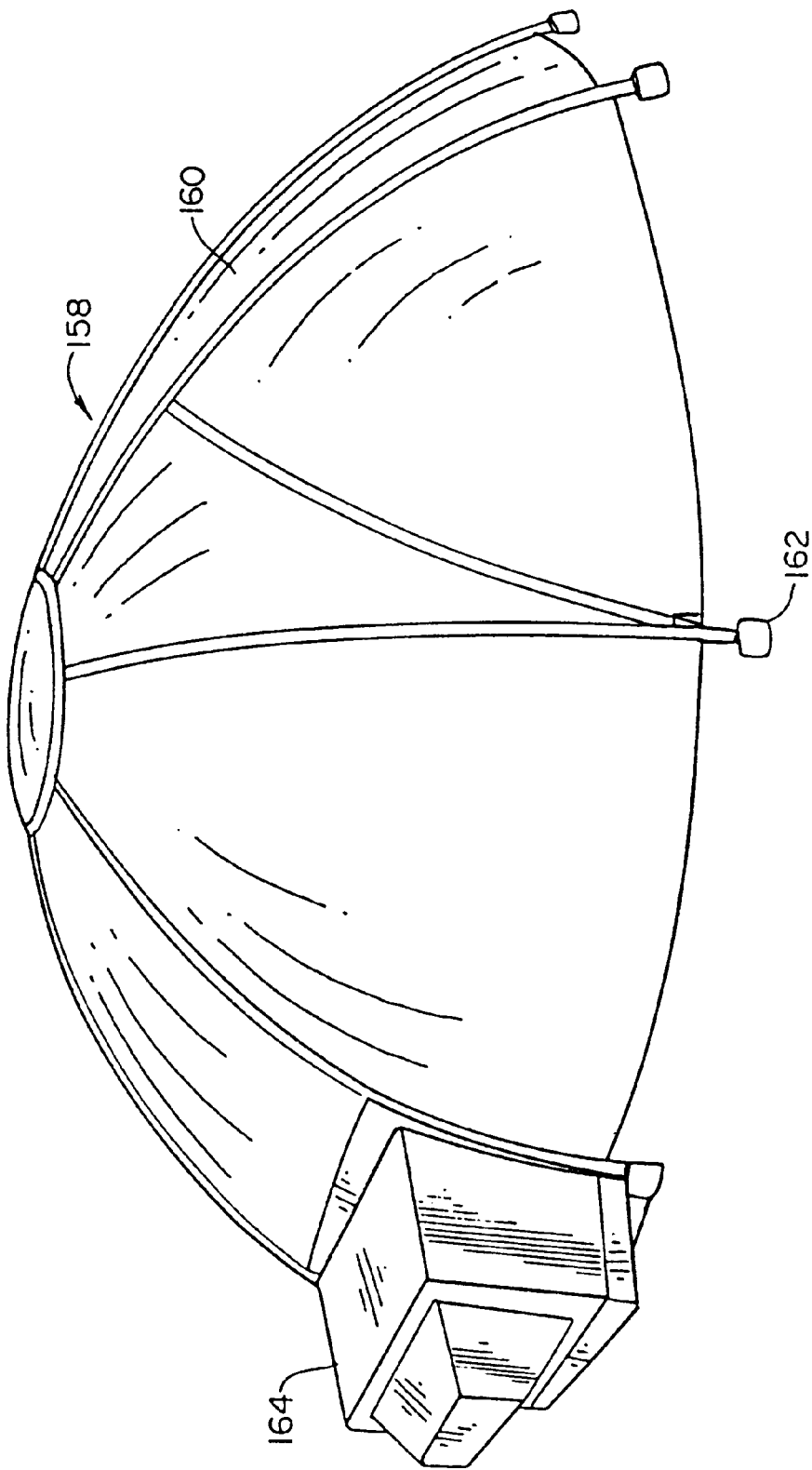
FIG. 22 is a perspective view of an alternative embodiment of the sound bubble according to the present invention.

FIG. 22 is a perspective view of an alternative embodiment of the sound bubble according to the present invention. The sound bubble 158 is comprised of a flexible material 160 supported by ribs 162. Preferably, the sound bubble is a collapsible "pup tent" in a manner well known in the art. In this embodiment the sound bubble 158 is dome shape and has an opening for a video monitor 164.

Figure 23:
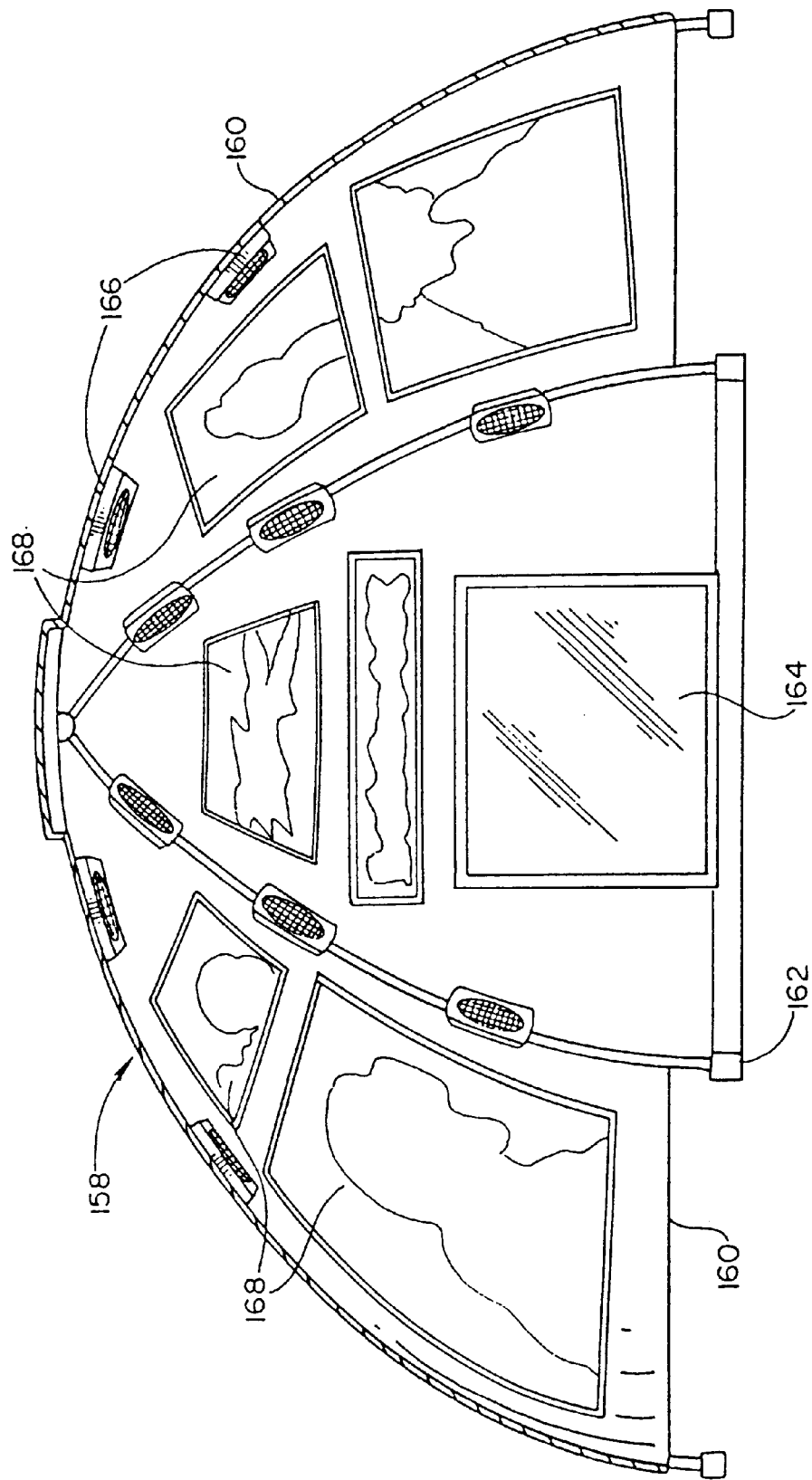
FIG. 23 is a cross-sectional view of the sound bubble 136 shown in FIG. 22.

FIG. 23 is a cross-sectional view of the sound bubble 158 shown in FIG. 22. The sound bubble 158 is comprised of a fabric or other flexible material 160 supported by ribs 162 and having a port or window 164 for a video monitor. Speakers 166 are supported by ribs 162, or alternatively sewn into the fabric 160 (not shown). Transparent backlit inserts 168 may be attached to the walls of the bubble 158 and are interchangeable depending on the particular video game used with the sound bubble 158. Electronically controlled light sources behind the transparent backlit inserts 168 are independent addressable and controllable by the playback unit, such as a video game controller.

Figure 24:
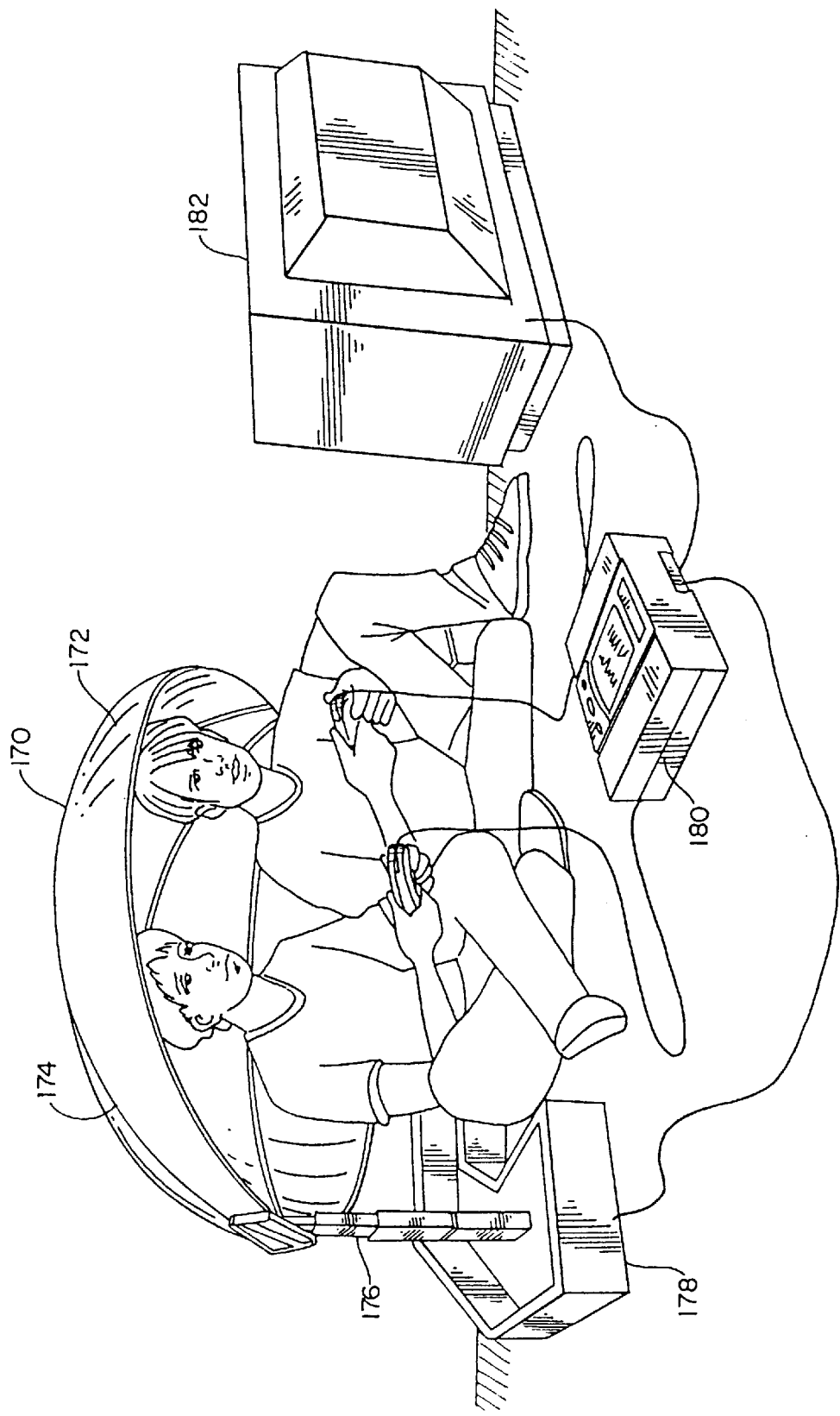
FIG. 24 is yet another alternative embodiment of the sound bubble according to the present invention.

FIG. 24 is yet another alternative embodiment of the sound bubble 170 according to the present invention. In this embodiment, the sound bubble 170 is a collapsible unit shaped as a dome. The sound bubble 170 is comprised of a flexible material or fabric 172 supported by ribs 174. The bubble 170 is supported by retractable arms 176 that are supported by a stand 178. A video game 180, monitor 182, and/or other playback unit, may be coupled to the sound bubble 170 by a cable or wireless interface.

Figure 25:
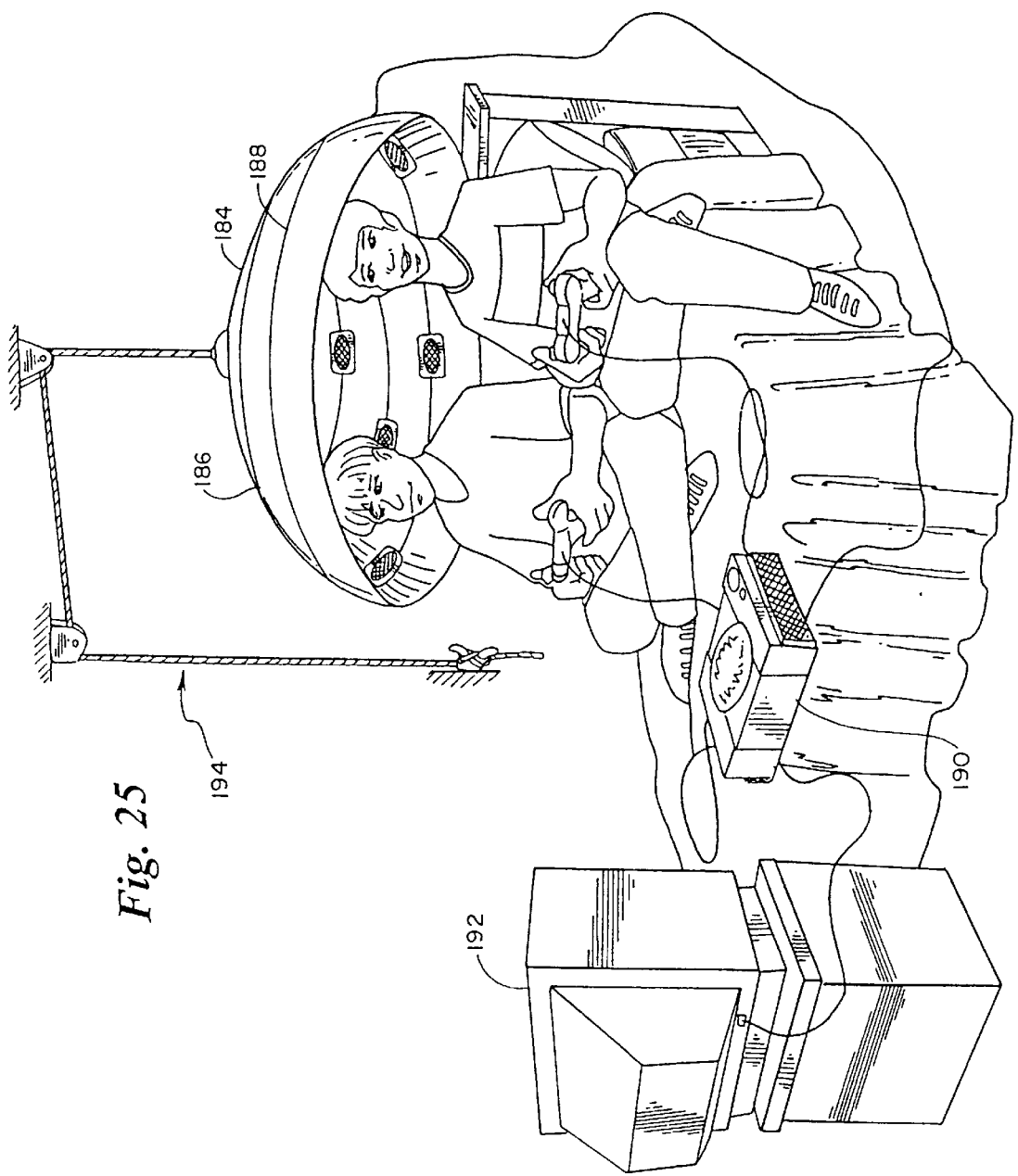
FIG. 25 is another alternative embodiment of the same sound bubble according to the present invention.

FIG. 25 is another alternative embodiment of the sound bubble 184 according to the present invention. In this embodiment, the sound bubble 184 is a collapsible unit suspended over a bed or other play area. Otherwise, the sound bubble 184 is similar to that shown in FIG. 26, wherein the sound bubble 184 is shaped as a dome, is comprised of a flexible material or fabric 186 supported by ribs 188, and may be coupled to a video game 190, television 192, or other playback device by a cable or wireless interface. When the sound bubble 184 is raised to the ceiling by the pulley mechanism 194, it flattens against the ceiling in a manner similar to a Chinese lantern.

Figure 26:
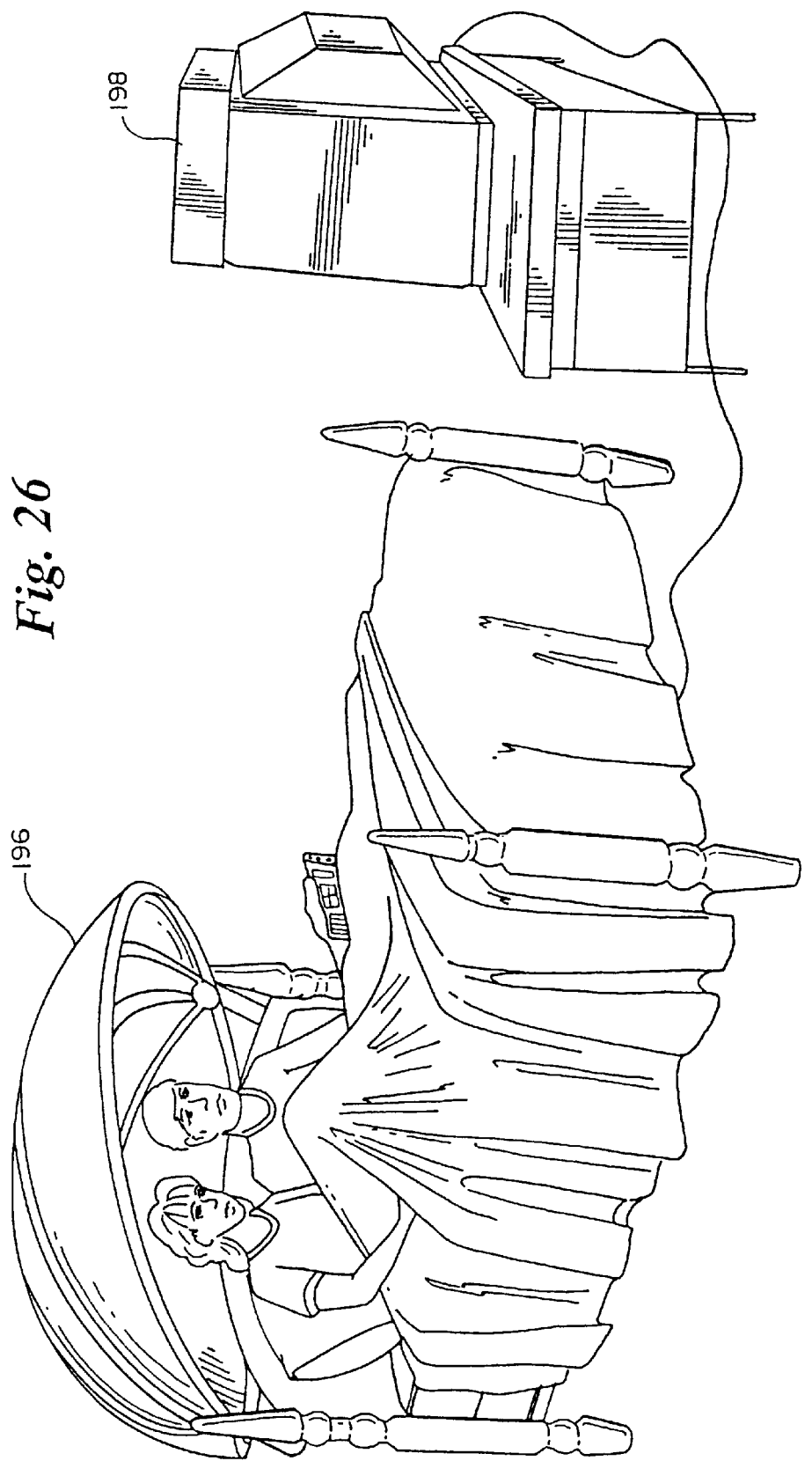
FIG. 26 is an alternative embodiment of the same sound bubble according to the present invention.

FIG. 26 is an alternative embodiment of the sound bubble 196 according to the present invention. In this embodiment, the sound bubble 196 is similar to that shown in FIG. 25 in that it is suspended over a bed or other play area. Otherwise, the sound bubble 196 is similar to that shown in FIG. 24, in that the sound bubble 196 is supported by a base or stand having arms extending vertically therefrom. However, in FIG. 26, the base and arms are hidden behind the baseboard of the bed. Further, the sound bubble 196 is similar to those previously discussed in that the sound bubble 196 is electrically connected to a television 196 or other playback device.

FIG. 27 is a perspective view of an alternative embodiment of the present invention according to the present invention. In this embodiment, termed a sound spider 200, the sound pixels 202 are integrally connected along a plurality of movable, articulated arms 204 connected to a central area 206 of the sound spider 200. The arms 204 are preferably a semi-rigid or rigid plastic or fiberglass, but can be positioned in various ways with three axes of movement. The central area 206 preferably comprises a subwoofer chamber that is ported downward through the base 208 of the sound spider 200.

FIG. 28 is another view of the sound spider 200 of FIG. 27, wherein the arms 204 of the sound spider 200 are fully deployed, so that the sound pixels 202 surround the occupants of the couch. In this embodiment, the sound spider 100 is electrically connected to a television or other playback device by cable 212 or other means. Each of the arms 204 comprise a plurality of integrally connected sound pixels 202. The arms 204 are semi-rigid, but can be positioned in various ways. The central area 206 of the sound spider 200 is hidden from view in the perspective of FIG. 28.

FIG. 29 is a perspective view of an alternative embodiment of the present invention according to the present invention. In this embodiment, the sound bubble 214 comprises a canopy positioned over the head of a person standing at a kiosk. The sound bubble 214 is a rigid or semi-rigid unit shaped as a dome. Preferably, the sound bubble 214 is hinged at 216 or is otherwise movable so that it rotates upward in a manner similar to a hatchback on a car, thereby allowing the sound bubble 214 to swing up and away from the kiosk to make entry and exit from the sound bubble 214 simpler. The sound bubble 214 is preferably electrically coupled to an audio/video playback unit 218 recessed into the wall of the kiosk, wherein a person can select from among different programs using a monitor 220 and keyboard 222 or other data entry device. The audio/ video playback unit 218 includes a controller 224 that retrieves audio and video material from a data storage device 226 within the unit 218, and then controls and synchronizes the playing of the audio and video material through the sound bubble 214 and the monitor 220.

FIG. 30 is another view of the structure of FIG. 29, wherein the kiosk provides a mechanism for playing movie trailers at theaters through a sound bubble 214 and video monitor 220. It is envisioned that this embodiment would provide an animated version of movie posters now found at theaters.

Figure 31:
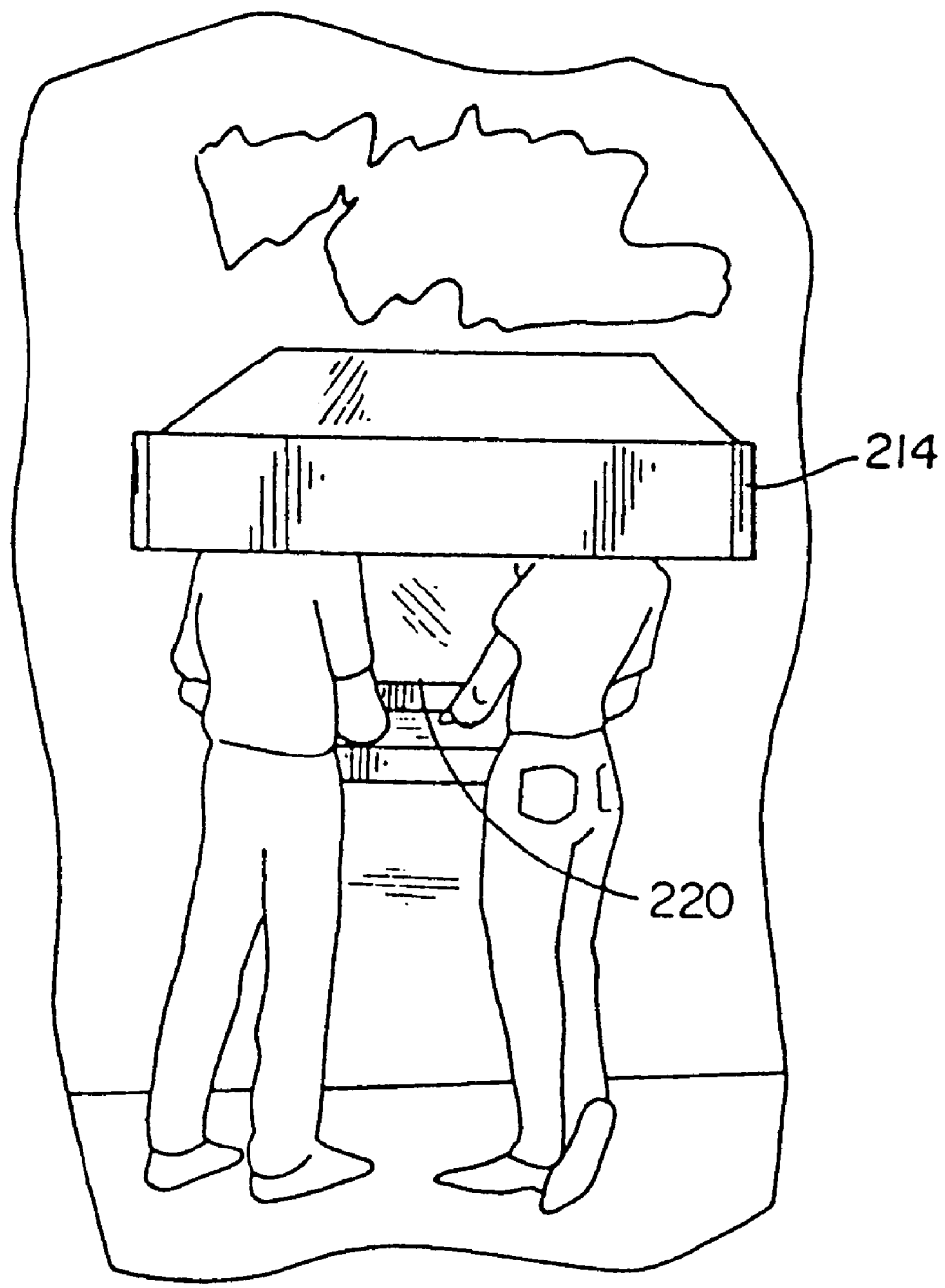
FIG. 31 is another view of the structure of FIG. 29.

FIG. 31 is another view of the structure of FIG. 29, wherein the kiosk provides a mechanism for playing movie trailers at video rental stores through a sound bubble 214 and video monitor 220.

Figure 32:
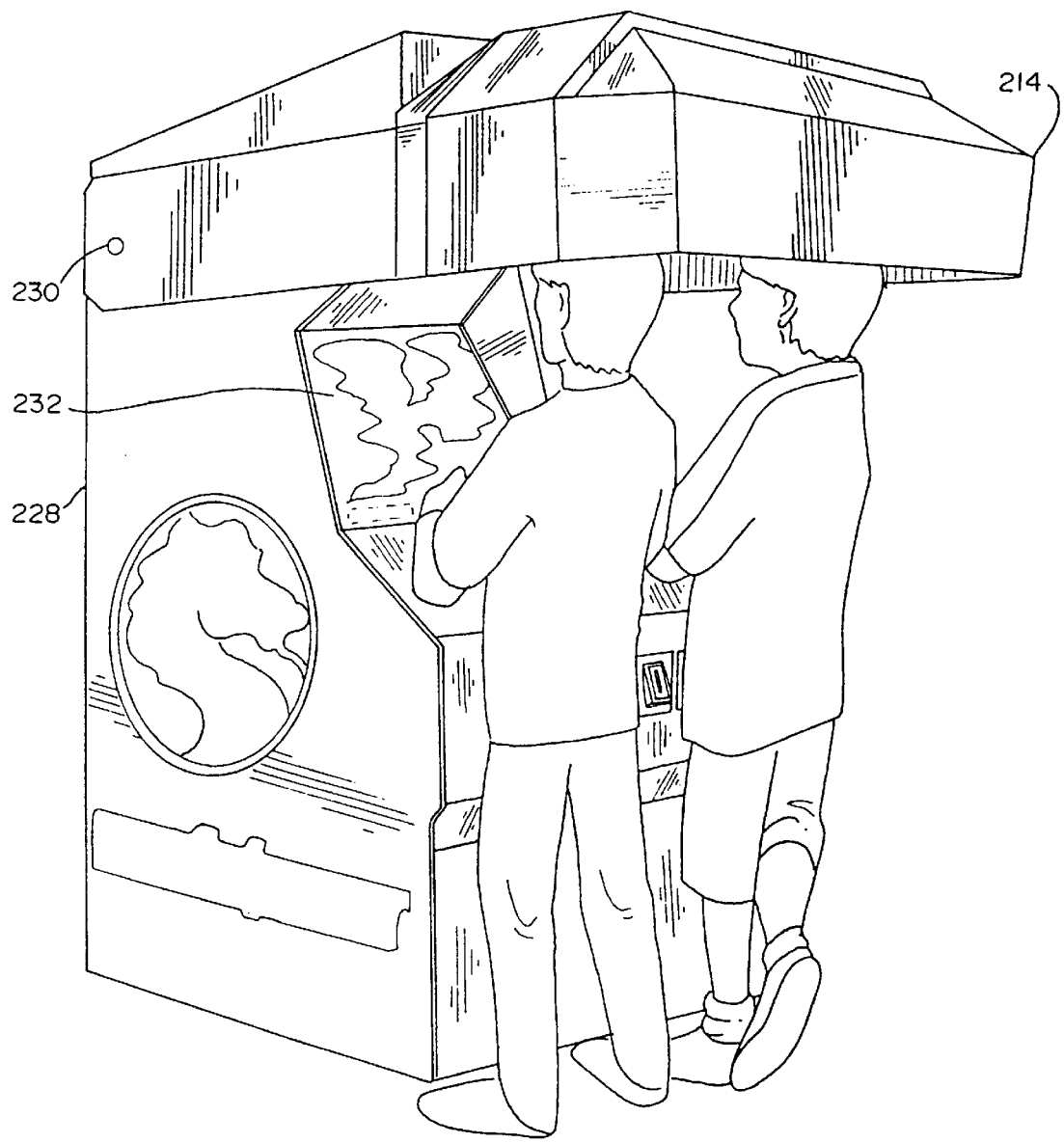
FIG. 32 is another view of the structure of FIG. 28.

FIG. 32 is another view of the structure of FIG. 29, wherein the sound bubble 214 comprises a canopy integrated into an arcade-model video game console 228 to provide enhanced sound effects. In this embodiment, the sound bubble 214 comprises a canopy positioned over the head of a person standing at the game console 228. The sound bubble 214 is a rigid or semi-rigid unit shaped as a dome. Preferably, the sound bubble 214 is hinged at 230 or otherwise movable so that it rotates upward in a manner similar to a hatchback on a car, thereby allowing the sound bubble 214 to swing up and away from the game console 228 to make entry and exit from the sound bubble 214 simpler. The movement of the sound bubble 214 could be made automatically or manually actuated, for example, by the insertion of a token or coin into the game console 228. The sound bubble 214 is preferably electrically coupled to the video game console 228, wherein the video game console 228 retrieves audio and video material from a data storage device within the unit 228, and then controls and synchronizes the playing of the audio and video material through the sound bubble 214 and the video monitor 232 of the game console 228.

Conclusion

This concludes the description of the preferred embodiment of the invention. The foregoing description of the preferred embodiment has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A sound bubble, comprising a plurality of sound pixels integrated into a deformable surface, the sound pixels comprising addressable transducers for generating acoustical energy, the sound pixels being arranged in a matrix having vertical and horizontal axes so as to support propagation and movement of the acoustical energy along the vertical and horizontal axes of the matrix, and the sound pixels being coupled to a playback device for producing at least one data stream for each of the sound pixels, wherein the sound pixels are synchronized and interlinked by the data streams to reproduce a time line for the acoustical energy source radiating and moving through the vertical and horizontal axes of the matrix.

2. The sound bubble of claim 1, wherein the deformable surface is comprised of a flexible material.

3. The sound bubble of claim 1, wherein the deformable surface is comprised of a collapsible material.

4. The sound bubble of claim 1, wherein the deformable surface is comprised of a transparent material.

5. The sound bubble of claim 1, wherein the deformable surface comprises a canopy.

* * * * *